(12) United States Patent
Clegg et al.

(10) Patent No.: US 7,432,460 B2
(45) Date of Patent: Oct. 7, 2008

(54) BUTTON ASSEMBLY WITH STATUS INDICATOR AND PROGRAMMABLE BACKLIGHTING

(75) Inventors: Paul T. Clegg, Lindon, UT (US);
Wallace E. Day, Payson, UT (US);
Douglas E. Allen, Lindon, UT (US)

(73) Assignee: Vantage Controls, Inc., Orem, UT (US)

( * ) Notice: Subject to any disclaimer, the term of this patent is extended or adjusted under 35 U.S.C. 154(b) by 0 days.

(21) Appl. No.: 11/786,574

(22) Filed: Apr. 11, 2007

(65) Prior Publication Data

US 2007/0209913 A1 Sep. 13, 2007

Related U.S. Application Data

(60) Division of application No. 10/654,778, filed on Sep. 3, 2003, which is a continuation-in-part of application No. 10/024,129, filed on Dec. 17, 2001, now Pat. No. 6,660,948.

(60) Provisional application No. 60/272,020, filed on Feb. 28, 2001.

(51) Int. Cl.
*H01H 13/70* (2006.01)

(52) U.S. Cl. .................... 200/5 A; 200/314; 200/344

(58) Field of Classification Search ................ 200/5 A, 200/517, 341–345, 310, 314; 341/22, 23, 341/28; 345/168–170
See application file for complete search history.

(56) References Cited

U.S. PATENT DOCUMENTS

| | | | |
|---|---|---|---|
| 2,482,773 A | 9/1949 | Hieronymus | |
| D163,736 S | 6/1951 | Bangert, Jr. | |
| 2,828,413 A | 3/1958 | Bowers | |
| 2,853,585 A | 9/1958 | Danziger et al. | |
| 3,284,667 A | 11/1966 | Harris et al. | |
| 3,491,249 A | 1/1970 | Rabinow | |

(Continued)

FOREIGN PATENT DOCUMENTS

CA 2 245 671 9/2003

(Continued)

OTHER PUBLICATIONS

Ademco, "No. 5827BD Wireless Bidirectional Console used with No. 5800TH Transmitter Module Installation Instructions and Operating Guide," Aug. 1993.

(Continued)

*Primary Examiner*—Michael A Friedhofer
(74) *Attorney, Agent, or Firm*—McCarter & English, LLP

(57) ABSTRACT

A configurable switch matrix assembly with button assembly is disclosed for keypads used in devices such as primary control points for automation systems in homes vehicles, or commercial environments. The configurable switch matrix assembly preferably includes a frame for supporting a plurality of positionable cross members and optionally a baffle. The cross members and frame each preferably include cantilevers which can be deflected by pressing the button assemblies to activate switches associated with the keypad. Dynamic status lights and back lights may provide illumination of varying colors and intensities. Button labels may be easily replaced in the button assemblies. Button assemblies of different sizes and shapes may be easily attached to the configurable switch matrix assembly in various configurations without the need for different attaching devices for each situation and/or environment.

16 Claims, 22 Drawing Sheets

U.S. PATENT DOCUMENTS

| | | |
|---|---|---|
| 3,579,030 A | 5/1971 | Bentham et al. |
| 3,689,886 A | 9/1972 | Durkee |
| 3,697,821 A | 10/1972 | Johnson |
| 3,706,914 A | 12/1972 | Van Buren |
| 3,707,682 A | 12/1972 | Harris |
| 3,736,591 A | 5/1973 | Rennels et al. |
| 3,746,923 A | 7/1973 | Spira et al. |
| 3,763,394 A | 10/1973 | Blanchard |
| 3,784,875 A | 1/1974 | Baker et al. |
| 3,867,596 A | 2/1975 | Schadow |
| 3,868,546 A | 2/1975 | Gilbreath et al. |
| 3,868,547 A | 2/1975 | Kappenhagen et al. |
| 3,885,116 A | 5/1975 | Kodaira |
| 3,918,062 A | 11/1975 | Haruki et al. |
| 3,940,660 A | 2/1976 | Edwards |
| 3,980,954 A | 9/1976 | Whyte |
| 3,986,423 A | 10/1976 | Rossum |
| 3,996,441 A | 12/1976 | Ohashi |
| 4,016,561 A | 4/1977 | Parker et al. |
| 4,057,751 A | 11/1977 | Bonsignore et al. |
| 4,060,735 A | 11/1977 | Pascucci et al. |
| 4,095,139 A | 6/1978 | Symonds et al. |
| D249,141 S | 8/1978 | Mayo |
| 4,123,756 A | 10/1978 | Nagata et al. |
| 4,131,777 A | 12/1978 | Bailey et al. |
| 4,156,866 A | 5/1979 | Miller |
| 4,163,218 A | 7/1979 | Wu |
| 4,169,972 A | 10/1979 | Black et al. |
| 4,185,531 A | 1/1980 | Oberheim et al. |
| 4,187,528 A | 2/1980 | Morriss |
| 4,194,099 A | 3/1980 | Mickelson |
| 4,196,388 A | 4/1980 | Weller et al. |
| 4,200,862 A | 4/1980 | Campbell et al. |
| 4,203,096 A | 5/1980 | Farley et al. |
| 4,206,443 A | 6/1980 | Britton |
| 4,225,808 A | 9/1980 | Saraceni |
| 4,246,494 A | 1/1981 | Foreman et al. |
| 4,253,048 A | 2/1981 | Osako |
| 4,259,619 A | 3/1981 | Wall |
| 4,262,180 A | 4/1981 | Walter |
| 4,274,045 A | 6/1981 | Goldstein |
| 4,277,727 A | 7/1981 | LeVert |
| 4,300,090 A | 11/1981 | Weber |
| 4,303,811 A | 12/1981 | Parkinson |
| 4,334,171 A | 6/1982 | Parman et al. |
| 4,336,464 A | 6/1982 | Weber |
| 4,338,595 A | 7/1982 | Newman |
| 4,339,632 A | 7/1982 | Early et al. |
| 4,359,670 A | 11/1982 | Hosaka et al. |
| 4,381,456 A | 4/1983 | Saito et al. |
| 4,388,567 A | 6/1983 | Yamazaki et al. |
| 4,390,814 A | 6/1983 | Peek |
| 4,392,187 A | 7/1983 | Bornhorst |
| 4,395,660 A | 7/1983 | Waszkiewicz |
| 4,418,333 A | 11/1983 | Schwarzbach et al. |
| 4,421,966 A | 12/1983 | Pounds |
| 4,436,972 A | 3/1984 | Scanlon |
| 4,437,169 A | 3/1984 | Bertenshaw et al. |
| 4,455,546 A | 6/1984 | Roszel |
| 4,463,287 A | 7/1984 | Pitel |
| 4,468,542 A | 8/1984 | Pounds |
| 4,471,493 A | 9/1984 | Schober |
| 4,484,190 A | 11/1984 | Bedard |
| 4,485,374 A | 11/1984 | Meserow et al. |
| 4,489,385 A | 12/1984 | Miller et al. |
| 4,491,843 A | 1/1985 | Boubouleix |
| 4,504,778 A | 3/1985 | Evans |
| 4,521,843 A | 6/1985 | Pezzolo et al. |
| 4,523,132 A | 6/1985 | Christiansen et al. |
| 4,524,288 A | 6/1985 | Schimmelpennink et al. |
| 4,527,198 A | 7/1985 | Callahan |
| 4,532,395 A | 7/1985 | Zukowski |
| 4,540,917 A | 9/1985 | Luchaco et al. |
| 4,550,276 A | 10/1985 | Callahan et al. |
| 4,560,909 A | 12/1985 | Peil |
| 4,563,592 A | 1/1986 | Yuhasz et al. |
| 4,575,660 A | 3/1986 | Zaharchuk et al. |
| 4,582,967 A | 4/1986 | Brumit et al. |
| 4,590,614 A | 5/1986 | Erat |
| D285,066 S | 8/1986 | Liss et al. |
| 4,611,198 A | 9/1986 | Levinson et al. |
| 4,628,440 A | 12/1986 | Thompson |
| 4,631,377 A | 12/1986 | Imazeki et al. |
| 4,635,040 A | 1/1987 | Masot |
| 4,638,299 A | 1/1987 | Campbell |
| 4,644,320 A | 2/1987 | Carr et al. |
| 4,680,536 A | 7/1987 | Roszel et al. |
| 4,684,822 A | 8/1987 | Angott |
| 4,689,547 A | 8/1987 | Rowen et al. |
| 4,691,341 A | 9/1987 | Knoble et al. |
| 4,695,820 A | 9/1987 | D'Aleo et al. |
| 4,697,227 A | 9/1987 | Callahan |
| 4,703,306 A | 10/1987 | Barritt |
| 4,714,983 A | 12/1987 | Lang |
| 4,716,409 A | 12/1987 | Hart et al. |
| 4,719,446 A | 1/1988 | Hart |
| 4,727,296 A | 2/1988 | Zaharchuk et al. |
| 4,728,949 A | 3/1988 | Platte et al. |
| 4,737,769 A | 4/1988 | Masot |
| 4,745,351 A | 5/1988 | Rowen et al. |
| 4,749,917 A | 6/1988 | Angott et al. |
| 4,751,385 A | 6/1988 | Van Benthusyen et al. |
| 4,755,792 A | 7/1988 | Pezzolo et al. |
| 4,764,981 A | 8/1988 | Miyahara et al. |
| 4,772,824 A | 9/1988 | Gulledge |
| 4,772,825 A | 9/1988 | Tabor et al. |
| 4,783,581 A | 11/1988 | Flowers et al. |
| 4,792,731 A | 12/1988 | Pearlman et al. |
| 4,797,599 A | 1/1989 | Ference et al. |
| 4,814,776 A | 3/1989 | Caci et al. |
| 4,823,069 A | 4/1989 | Callahan et al. |
| 4,825,209 A | 4/1989 | Sasaki et al. |
| 4,843,386 A | 6/1989 | Wolf |
| 4,864,588 A | 9/1989 | Simpson et al. |
| 4,876,552 A | 10/1989 | Zakman |
| 4,878,010 A | 10/1989 | Weber |
| 4,880,950 A | 11/1989 | Carson et al. |
| 4,889,999 A | 12/1989 | Rowen |
| 4,893,062 A | 1/1990 | D'Aleo et al. |
| 4,908,485 A * | 3/1990 | Honda et al. ............... 200/462 |
| 4,908,806 A | 3/1990 | Nickolaus |
| 4,918,432 A | 4/1990 | Pauley et al. |
| 4,918,717 A | 4/1990 | Bissonnette et al. |
| 4,924,109 A | 5/1990 | Weber |
| 4,924,151 A | 5/1990 | D'Aleo et al. |
| 4,940,903 A | 7/1990 | Brown, Jr. et al. |
| 4,948,987 A | 8/1990 | Weber |
| D310,349 S | 9/1990 | Rowen |
| 4,955,084 A | 9/1990 | Umetsu et al. |
| D311,382 S | 10/1990 | Mayo et al. |
| D311,485 S | 10/1990 | Jacoby et al. |
| D311,678 S | 10/1990 | Graef et al. |
| 4,980,806 A | 12/1990 | Taylor et al. |
| D313,738 S | 1/1991 | Mayo et al. |
| 4,995,053 A | 2/1991 | Simpson et al. |
| 5,003,318 A | 3/1991 | Berneking et al. |
| 5,012,225 A | 4/1991 | Gill |
| 5,017,837 A | 5/1991 | Hanna et al. |
| 5,027,106 A | 6/1991 | Lizzi et al. |
| 5,028,853 A | 7/1991 | Brown, Jr. et al. |
| 5,030,893 A | 7/1991 | Spira et al. |
| 5,034,602 A | 7/1991 | Garcia, Jr. et al. |
| D319,429 S | 8/1991 | D'Aleo et al. |
| 5,041,825 A | 8/1991 | Hart et al. |

| | | | | | | |
|---|---|---|---|---|---|---|
| 5,051,720 A | 9/1991 | Kittirutsunetorn | | 5,950,809 A * | 9/1999 | Andre ........................ 200/314 |
| 5,059,871 A | 10/1991 | Pearlman et al. | | 5,960,942 A | 10/1999 | Thornton |
| 5,079,559 A | 1/1992 | Umetsu et al. | | 5,962,109 A | 10/1999 | Schwietz |
| 5,086,385 A | 2/1992 | Launey et al. | | 5,975,711 A | 11/1999 | Parker et al. |
| 5,099,193 A | 3/1992 | Moseley et al. | | 5,977,901 A | 11/1999 | Fenner |
| 5,103,209 A | 4/1992 | Lizzi et al. | | 5,982,103 A | 11/1999 | Mosebrook et al. |
| 5,109,222 A | 4/1992 | Welty | | 6,032,202 A | 2/2000 | Lea et al. |
| 5,113,498 A | 5/1992 | Evan et al. | | 6,080,940 A | 6/2000 | Rice |
| D327,255 S | 6/1992 | D'Aleo et al. | | 6,091,205 A | 7/2000 | Newman, Jr. et al. |
| 5,128,855 A | 7/1992 | Hilber et al. | | 6,092,903 A | 7/2000 | Higgins, Jr. |
| 5,146,153 A | 9/1992 | Luchaco et al. | | 6,100,659 A | 8/2000 | Will et al. |
| 5,165,530 A * | 11/1992 | Shinohara et al. ........... 200/314 | | 6,140,987 A | 10/2000 | Stein et al. |
| 5,175,477 A | 12/1992 | Grissom | | 6,169,256 B1 | 1/2001 | Hanahara et al. |
| 5,187,655 A | 2/1993 | Post et al. | | 6,180,895 B1 | 1/2001 | Hutchinson et al. |
| 5,189,412 A | 2/1993 | Mehta et al. | | 6,184,481 B1 | 2/2001 | Chen |
| 5,191,265 A | 3/1993 | D'Aleo et al. | | 6,192,282 B1 | 2/2001 | Smith et al. |
| 5,201,408 A * | 4/1993 | Torma et al. ................ 200/294 | | 6,199,136 B1 | 3/2001 | Shteyn |
| 5,209,560 A | 5/1993 | Taylor et al. | | 6,201,364 B1 | 3/2001 | Will et al. |
| 5,225,765 A | 7/1993 | Callahan et al. | | 6,207,913 B1 | 3/2001 | Nakajima et al. |
| 5,237,264 A | 8/1993 | Moseley et al. | | 6,210,010 B1 * | 4/2001 | Pontetti et al. ................ 362/24 |
| 5,239,205 A | 8/1993 | Hoffman et al. | | 6,233,132 B1 | 5/2001 | Jenski |
| 5,247,293 A | 9/1993 | Nakagawa | | 6,310,609 B1 | 10/2001 | Morgenthaler |
| 5,248,919 A | 9/1993 | Hanna et al. | | 6,331,687 B1 | 12/2001 | Dunk et al. |
| 5,280,296 A | 1/1994 | Tan et al. | | 6,355,890 B1 | 3/2002 | Kuroda |
| D344,264 S | 2/1994 | D'Aleo et al. | | 6,359,562 B2 | 3/2002 | Rubin |
| 5,311,656 A | 5/1994 | Eldershaw | | 6,369,524 B1 | 4/2002 | Sid |
| 5,321,736 A | 6/1994 | Beasley | | 6,369,800 B1 | 4/2002 | Nading et al. |
| 5,327,426 A | 7/1994 | Dolin, Jr. et al. | | 6,384,355 B1 * | 5/2002 | Murphy et al. ............... 200/344 |
| 5,340,954 A | 8/1994 | Hoffman et al. | | 6,400,271 B1 | 6/2002 | Davies, Jr. et al. |
| 5,349,362 A | 9/1994 | Forbes et al. | | D461,782 S | 8/2002 | Butler et al. |
| 5,357,170 A | 10/1994 | Luchaco et al. | | 6,453,687 B2 | 9/2002 | Sharood et al. |
| 5,361,184 A | 11/1994 | El-Sharkawi et al. | | 6,467,924 B2 | 10/2002 | Shipman |
| 5,361,985 A | 11/1994 | Rein et al. | | 6,493,874 B2 | 12/2002 | Humpleman |
| 5,367,133 A | 11/1994 | Schmidt et al. | | 6,510,995 B2 | 1/2003 | Muthu et al. |
| 5,373,411 A | 12/1994 | Grass et al. | | 6,523,696 B1 | 2/2003 | Saito et al. |
| 5,382,947 A | 1/1995 | Thaler et al. | | 6,549,190 B1 | 4/2003 | Windrem |
| 5,399,940 A | 3/1995 | Hanna et al. | | 6,555,774 B1 | 4/2003 | Nielsen |
| 5,400,041 A | 3/1995 | Strickland | | 6,575,607 B1 | 6/2003 | Klemish et al. |
| 5,400,246 A | 3/1995 | Wilson et al. | | 6,590,176 B2 * | 7/2003 | Cole et al. .................. 200/341 |
| 5,401,927 A | 3/1995 | Lundell et al. | | 6,593,530 B2 | 7/2003 | Hunt |
| 5,430,356 A | 7/1995 | Ference et al. | | 6,608,271 B2 | 8/2003 | Duarte |
| 5,436,510 A | 7/1995 | Gilbert | | 6,618,764 B1 | 9/2003 | Shteyn |
| 5,452,291 A | 9/1995 | Eisenhandler et al. | | 6,640,141 B2 | 10/2003 | Bennett |
| 5,455,464 A | 10/1995 | Gosling | | 6,646,843 B1 | 11/2003 | Newman, Jr. et al. |
| 5,455,761 A | 10/1995 | Kushiro et al. | | 6,674,248 B2 | 1/2004 | Newman, Jr. et al. |
| 5,463,286 A | 10/1995 | D'Aleo et al. | | 6,680,730 B1 | 1/2004 | Shields et al. |
| 5,467,264 A | 11/1995 | Rauch et al. | | 6,753,661 B2 | 6/2004 | Muthu et al. |
| 5,473,202 A | 12/1995 | Mudge et al. | | 6,774,328 B2 | 8/2004 | Adams et al. |
| 5,481,750 A | 1/1996 | Parise et al. | | 6,797,902 B2 | 9/2004 | Farage et al. |
| 5,490,144 A | 2/1996 | Tran et al. | | 6,882,111 B2 | 4/2005 | Kan et al. |
| 5,495,406 A | 2/1996 | Kushiro et al. | | 6,909,424 B2 | 6/2005 | Liebenow et al. |
| 5,523,631 A | 6/1996 | Fishman et al. | | 6,931,364 B1 | 8/2005 | Anturna |
| 5,555,150 A | 9/1996 | Newman, Jr. | | 6,950,087 B2 | 9/2005 | Knox et al. |
| 5,563,459 A | 10/1996 | Kurosawa et al. | | 6,965,848 B2 | 11/2005 | Ballus |
| 5,565,855 A | 10/1996 | Knibbe | | 6,967,448 B2 | 11/2005 | Morgan et al. |
| 5,565,865 A | 10/1996 | So | | 6,967,565 B2 | 11/2005 | Lingemann |
| 5,574,431 A | 11/1996 | McKeown et al. | | 7,130,774 B2 | 10/2006 | Thomas et al. |
| 5,588,760 A | 12/1996 | So | | 2001/0000422 A1 | 4/2001 | Sid |
| 5,598,322 A | 1/1997 | Von Arx et al. | | 2001/0047250 A1 | 11/2001 | Schuller et al. |
| 5,637,930 A | 6/1997 | Rowen et al. | | 2001/0047251 A1 | 11/2001 | Kemp |
| 5,638,296 A | 6/1997 | Johnson et al. | | 2001/0055003 A1 | 12/2001 | Chi et al. |
| 5,640,141 A | 6/1997 | Myllymäki | | 2002/0016639 A1 | 2/2002 | Smith et al. |
| 5,657,005 A | 8/1997 | Seebeck et al. | | 2002/0026533 A1 | 2/2002 | Dutta et al. |
| 5,668,358 A | 9/1997 | Wolf et al. | | 2002/0037004 A1 | 3/2002 | Bossemeyer et al. |
| 5,711,588 A | 1/1998 | Rudisill | | 2003/0009315 A1 | 1/2003 | Thomas et al. |
| 5,726,644 A | 3/1998 | Jednacz et al. | | 2003/0012035 A1 | 1/2003 | Bernard |
| 5,736,965 A | 4/1998 | Mosebrook et al. | | 2003/0052770 A1 | 3/2003 | Mansfield, Jr. et al. |
| 5,748,828 A | 5/1998 | Steiner et al. | | 2003/0056012 A1 | 3/2003 | Modeste et al. |
| 5,796,382 A | 8/1998 | Beeteson | | 2003/0129969 A1 | 7/2003 | Rucinski |
| 5,801,345 A | 9/1998 | Mikula-Curtis et al. | | 2003/0227894 A1 | 12/2003 | Wang et al. |
| 5,861,809 A | 1/1999 | Eckstein et al. | | 2003/0233429 A1 | 12/2003 | Matte et al. |
| 5,905,442 A | 5/1999 | Mosebrook et al. | | 2004/0024624 A1 | 2/2004 | Ciscon et al. |
| 5,912,443 A | 6/1999 | Hasunuma | | 2004/0037288 A1 | 2/2004 | Bourgart et al. |

| | | | |
|---|---|---|---|
| 2004/0038683 | A1 | 2/2004 | Rappaport et al. |
| 2004/0054747 | A1 | 3/2004 | Breh et al. |
| 2004/0088082 | A1 | 5/2004 | Ahmed |
| 2004/0113945 | A1 | 6/2004 | Park et al. |
| 2004/0143428 | A1 | 7/2004 | Rappaport et al. |
| 2004/0225811 | A1 | 11/2004 | Fosier |
| 2004/0267385 | A1 | 12/2004 | Lingemann |

FOREIGN PATENT DOCUMENTS

| | | |
|---|---|---|
| DE | 30 08 339 A1 | 9/1981 |
| DE | 30 12 840 A1 | 10/1981 |
| DE | 32 21 873 A1 | 1/1984 |
| DE | 32 24 997 A1 | 1/1984 |
| DE | 219 637 A1 | 3/1985 |
| DE | 43 08 161 A1 | 9/1994 |
| DE | 103 06 080 A1 | 8/2004 |
| EP | 0 022 516 | 1/1981 |
| EP | 0 040 339 | 11/1981 |
| EP | 0 054 582 | 6/1982 |
| EP | 0 196 347 | 10/1986 |
| EP | 0 293 569 | 12/1988 |
| EP | 0 327 128 | 8/1989 |
| EP | 0 346 614 | 12/1989 |
| EP | 0 357 136 | 3/1990 |
| EP | 0 361 734 | 4/1990 |
| EP | 0 435 224 | 7/1991 |
| EP | 0 466 152 | 1/1992 |
| EP | 0 513 443 | 11/1992 |
| EP | 0 552 769 | 7/1993 |
| EP | 0 555 869 | 8/1993 |
| EP | 0 558 349 | 9/1993 |
| EP | 0 616 451 | 9/1994 |
| EP | 0 626 635 | 11/1994 |
| EP | 0 687 078 | 12/1995 |
| FR | 2 702 115 | 9/1994 |
| GB | 1 090 891 | 11/1967 |
| GB | 1 215 009 | 12/1970 |
| GB | 2 076 180 | 11/1981 |
| GB | 2 097 918 | 11/1982 |
| GB | 2 099 222 | 12/1982 |
| GB | 2 166 328 | 4/1986 |
| WO | WO-86/06890 | 11/1986 |
| WO | WO-90/08418 | 7/1990 |
| WO | WO-93/13507 | 7/1993 |
| WO | WO-95/32595 | 11/1995 |
| WO | WO-97/29560 | 8/1997 |

OTHER PUBLICATIONS

Ademco, "No. 5827BD Wireless Bidirectional Console Installation and Setup Guide," Feb. 2004.
Advanced Control Technologies, Inc., "Innovative and Quality Solutions to Control Problems!" www.act-solutions.com, at least as early as Aug. 23, 2005.
Advanced Control Technologies, Inc., "Introducing the Next Generation of Home Control Systems HomePro RF," Mar. 17, 2006.
"The search for standard automation protocols narrows," Air Conditioning Heating & Refigeration News, vol. 191, No. 5, p. 9, Jan. 1994.
Anonymous, "Echelon releases Lonworks control network protocol, opening up huge potential," Sensor Review, vol. 16, No. 4, p. 9, 1996.
Anonymous, "New products offer high-speed transmission in control networks," Sensor Review, vol. 13, No. 4, p. 39, 1993.
"1 Million Nodes," Appliance Manufacturer, vol. 44, No. 1, p. 16, Jan. 1996.
Ballerini et al., "AISI Research and MPR Ltd. to Develop and Market Home Automation Products for Telecommunications Industry," Business Wire, Sec. 1, p. 1, Jun. 2, 1989.
Berger, "Plug-In Remote Controls For The Whole House," Home Mechanix, vol. 88, No. 762, pp. 26-29, 76, Feb. 1992.
Bertsch, "Development Tools for Home Automation," IEEE Transactions on Consumer Electronics, vol. 36, No. 4, pp. 854-858, Nov. 1990.
Beuth Verlag GMBH, "DIN 19 245 Teil 1: Profibus," DIN Deutsches Institute fur Normung E.V., Apr. 1991.
Boughton, "Hard-Wired Home: Automated systems can control everything from lights to curling irons to hot tubs—all at the push of a button," The San Francisco Chronicle, p. Z1, Aug. 30, 1995.
Buffkin, "CEBus, LonWorks heading from 'HomeLAN,'" Electronic Engineering Times, vol. 847, p. 58, May 8, 1995.
Bushby, "The BACnet communication protocol for building automation systems," Ashrae Journal, pp. 14-21, Apr. 1991.
"Getting all your appliances on the same wavelength," Business Week, vol. 3088, p. 92E, Jan. 23, 1989.
Butler, "Personal Technology at Home with Technology: LonWorks may run home of the future," The Atlanta Journal the Atlanta Constitution, p. P6, Nov. 19, 1995.
Butler, "Wireless Light Switch Flexible, Easy to Install," The Columbus Dispatch, p. 10H, Oct. 23, 1993.
Butler, "Add-On Light Switches Eliminate Wiring Hassles," Roanoke Times & World News, p. 3, Jun. 6, 1995.
Bybee, "Build Reacts: The Radio-Electronics Advanced Control System," Radio-Electronics, vol. 59, No. 10, p. 65, Oct. 1988.
Caristi, "Carrier-current remote control," Electronics Now, vol. 66, No. 6, p. 49, Jun. 1, 1995.
Carlin, "On the bus," Sound & Image, vol. 4, No. 3, p. 20, Fall, 1994.
"What's new in CBus Shop™?" www.cbus-shop.com, at least as early as Jun. 18, 2004.
"U105RHH001BPW1: Handheld Remote Unit—Pearl White," www.cbus-shop.com, at least as early as Jun. 18, 2004.
Coffey, "CEBus," email, at least as early as Jul. 2004.
"Open the pod bay door," Compute!, vol. 14, No. 11, p. 44, Dec. 1992.
Cooper, "X10 FAQ html version. Based on the X10 FAQ version 1.08," Jan. 8, 1995.
Crevier, "Scott Crevier's X-10 Web Interface," at least as early as Nov. 11, 2002.
Cross et al., "A Fiber Optic Home Automation System," IEEE Transactions on Consumer Electronics, vol. 39, No. 3, pp. 636-645, Aug. 1993.
Davidson, "Echelon's Local Operating Network," Circuit Cellar Ink, pp. 74-77, Jun./Jul. 1991.
Davidson, "Take a Tour of the Bright Home," The Computer Applications Journal, vol. 25, pp. 14-21, Feb./Mar. 1992.
Davidson, "CEBus: A New Standard in Home Automation," Circuit Cellar Ink, pp. 40-52, Aug./Sep. 1989.
Davidson, "CEBus Update," Circuit Cellar Ink, pp. S2-S10, Building Automation Special.
Davidson, "CEBus Gets Physical," Circuit Cellar Ink, pp. 103-104, Feb./Mar. 1991.
Davidson, "CEBus Update: More Physical Details Available," Circuit Cellar Ink, pp. 66-72, Jun./Jul. 1991.
Davidson, "CEBus Goes Coax," The Computer Applications Journal, vol. 25, pp. 108-110, Feb./Mar. 1992.
Davidson, "Habitech 94," The Computer Applications Journal, vol. 47, pp. 46-51, Jun. 1994.
Davis, "Zigbee Aims at Home, Utility Markets," www.reed-electronics.com/electronicnews/article/CA469135%20, Oct. 7, 2004.
Delaney, "The CEBus perspective," Appliance Manufacturer, vol. 41, No. 5, p. 31, May 1993.
Dichristina et al., "Controlling the Home," Popular Science, vol. 240, No. 5, p. 48, May 1992.
Dilouie, "Automated Controls Can Save Energy," Facilities Design & Management, vol. 14, No. 11, p. 35, Nov. 1995.
Douligeris et al., "The Consumer Electronic Bus Symbol Encoding Sublayer: A Twisted Pair Implementation," IEEE, pp. 385-388, 1992.
Douligeris, "Intelligent Home Systems: Low-cost computers and fiber optics make it possible to implement systems that can integrate data, voice, and visual communications inside the home," IEEE Communications Magazine, pp. 52-61, Oct. 1993.
Douligeris et al., "Communications and Control for a Home Automation System," IEEE, pp. 171-175, 1991.
Driscoll, "A Timeline for Home Automation," www.eddriscoll.com, 2002.
Edden, "Modelling CEBus Home Automation with Knowledge Based Tools," IEEE, pp. 623-627, 1990.

"LONworks gets interface boards," Electronic Engineering Times, p. 54, Jul. 3, 1995.
Electronic Industries Association. EIA-600 (Sections 600.10, 600.31, 600.32, 600.33, 600.35, 600.37, 600.38, 600.41, 600.42, 600.81, and 600.82). Feb. 1995.
"New CEBus devices target energy management," Electronic News, vol. 40, No. 2006, p. 48, Mar. 21, 1994.
"Intellon-IBM CEBus deal eyes energy/com system," Electronic News, vol. 41, No. 2063, p. 24, May 1, 1995.
"Intellon spins home automation roadmap," Electronic News, vol. 41, No. 2064, p. 46, May 8, 1995.
"WA firm wins US automation award," Electronics Australia, vol. 57, No. 1, p. 123, Jan. 1995.
Evans, "Solving Home Automation Problems Using Artificial Intelligence Techniques," IEEE, pp. 395-400, 1991.
Evans, "CAL: Part of the Solution," Home Automation & Building Control, pp. 59-67, Jul. 1995.
Evans, The CEBus Standard User's Guide: A Complete Technical Overview, The Training Department Publications, 1996.
Fisher, "Switch-On CEBus: A CAL Interpreter," The Computer Applications Journal, vol. 31, pp. 24-30, Feb. 1993.
"Home automation," Futurist, vol. 28, No. 5, p. 7, Sep./Oct. 1994.
GE. Appendix A, GE Authentication and Encryption Algorithm. Version II. Nov. 1995.
Gfeller et al., "Wireless In-House Data Communication via Diffuse Infrared Radiation," Proceedings of the IEEE, vol. 61, No. 11, pp. 1474-1486, Nov. 1979.
Gikas, "Total Home Control Home Control from Your Car," Home Mechanix, vol. 91, No. 794, p. 24, Apr. 1995.
Gilmore, "The Integrated automated educated house," Popular Science, vol. 236, No. 6, p. 104, Jun. 1990.
Gilmore, "The World's Smartest Houses," Popular Science, vol. 237, No. 3, pp. 56-65, Sep. 1990.
Gilmore et al., "Open (automated) house," Popular Science, vol. 237, No. 4, p. 48, Oct. 1990.
"Home Automation: GSI Home Automation Controller—The Next Generation in Home Automation?" www.globalsuccessinc.com, 2003.
Gorzelany, "Hot new electronics," J. Consumers Digest, vol. 28, No. 3, p. 74, May/Jun. 1989.
Home Controls, Inc., Home Automation and Networking Catalog, No. 52, Fall 2005.
Homepro, "ZTH100 Radio Frequency Wireless Controller," 2001.
"Z-Wave Information," www.homeseer.com, at least as early as Jun. 21, 2004.
"Z-Wave Lamp Module (HomePro)," www.homeseer.com, at least as early as Jun. 21, 2004.
"Z-Wave Remote Control (ivory)," www.homeseer.com, at least as early as Jun. 21, 2004.
Horowitz et al., The Art of Electronics, 1989, Cambridge University Press, 2nd Ed., pp. 595-598.
House, "CEBus for the Masses," Home Automation & Building Control, pp. 61-68, Apr. 1995.
Hunt et al., "Are We There Yet?: CEBus Ready to Bring 'Home of the Future' into the Present," Chicago Tribune, p. 22, Mar. 1, 1996.
Intellon Corporation, "Intellon HomePlug® Family of Products," 2005.
Intellon Corporation, "SSC P485 PL Transceiver IC," at least as early as Jul. 3, 2006.
Interim Standard. IS-60.04 Node Communications Protocol, Part 6: Application Layer Specification. Apr. 1996.
Iversen, "A New Push Begins to Sell a Home Bus," Electronics, vol. 61, No. 12, p. 40, Jun. 1988.
"Building Blocks for Home Automation," IW, p. 23, May 15, 1995.
Jancsurak, "Smart receptacle for smart plugs," Electronic Industries Association, vol. 41, No. 4, p. 62, Apr. 1993.
Karpinski, "In-home networks draw industry attention," Interactive Age, vol. 2, No. 6, p. 39, Jan. 16, 1995.
Keefe, Jr., "Power Line Modem for Home Control," Electronics Now, p. 65, Mar. 1994.
Khawand et al., "Common Application Language (CAL) and Its Integration into a Home Automation System," IEEE, pp. 157-162, 1991.

Kingery, "Which One Should I Use?" at least as early as Jun. 30, 2006.
Kingery, "Which One Should I Use, Part XII (Preamble)," at least as early as Jun. 30, 2006.
Kingery, "'Digital X-10' Which One Should I Use, Part XIII (Preamble)," at least as early as Jun. 30, 2006.
Kingery, "'Two Way and Extended Code' Which One Should I Use, Part XIV (Preamble)," at least as early as Jun. 30, 2006.
Kingery, "Which One Should I Use #17. What is 'Extended Code'? (and does it wear a tuxedo?) Part 1—Different Ways of Counting," at least as early as Jun. 30, 2006.
Kingery, "Which One Should I Use #18. What is 'Extended Code'? Part 2—Big Indians and Little Indians," at least as early as Jun. 30, 2006.
Kirschner, "Smarts at Last?" Popular Science, vol. 247, No. 1, p. 38, Jul. 1995.
Kleiman, "MacDaniel's Advice: Introduction to the X10 System," Sep. 24, 2001.
Krause, "Echelon-CEbus rivalry tangles decoder specs," Electronic News, vol. 41, No. 2067, p. 1, May 29, 1995.
Krause, "EIA sees potential CEBus role in U.S. NII Proposal," Electronic News, vol. 40, No. 2021, p. 38, Jul. 4, 1994.
Kung, "Perceived requirements concerning home automation," Trialog, pp. 1-5, Dec. 1995.
Lamson & Sessions, Product Installation Instructions, 2004.
Langreth, "Slow going for smart homes," Popular Science, vol. 242, No. 2, p. 60, Feb. 1993.
Leeb, "A User Interface for Home-Net," IEEE, pp. 897-902, 1994.
Lutron Electronics Co., Inc., "Homeworks® seeTouch J Ordering Guide," 2003.
Lutron Electronics Co., Inc., "Homeworks® Interactive Vareo®-Style Local Lighting Controls," 1998.
Lutron Electronics Co., Inc., Residential Lighting Controls Catalog, at least as early as Jun. 28, 2006.
Lutron Electronics Co., Inc., "RadioRA® Wireless Home Lighting Control RA-IR, RB-IR Setup and Installation Guide Addendum for RadioRA® Infrared Interface," 2001.
Lutron Electronics Co., Inc., "RadioRA® Wireless Home Lighting Control RAMC-MFE, RBMC-MFE Setup and Installation for a RadioRA® Multi-Function Entry Master Control," 2001.
Lutron Electronics Co., Inc., "RadioRA® Wireless Home Lighting Control Installation Instructions for Visor Control Transmitter," 2001.
Markwalter et al., "Design Influences for the CEbus Automation Protocol," IEEE, pp. 145-153, 1991.
McGrath, "Seizing the future," Electric Perspectives, vol. 14, No. 6, p. 14, Nov./Dec. 1990.
McLeister, "Builders in Subdivisions, Scattered Sites Gain Edge with Home Automation," Professional Builder, pp. 82-83, Feb. 1995.
McLeister, "Dramatic Changes Lie Ahead For Home Automation," Professional Builder, p. 101, Feb. 1994.
Meth, "Where Will Smart Homes Get Their Smarts?" Electronic Design, vol. 43, No. 19, pp. 61-64, Sep. 18, 1995.
Munro, "Automating the Home," Washington Technology, p. 1, Nov. 9, 1995.
Murray, "Wired and ready," Popular Science, vol. 247, No. 2, p. 36, Aug. 1995.
Nisley, "Two-Way Power Line Communication," The Computer Applications Journal, vol. 25, pp. 74-81, Feb./Mar. 1992.
Pacelle, "Automation Is Knocking at U.S. Homes—TVs Can Talk to Thermostats, but Cost Keeps Most Doors From Opening," Asian Wall Street Journal, p. 7, Sep. 29, 1992.
Palenchar, "Z-Wave Takes on Home-Automation Market," www.twice.com, Mar. 22, 2004.
Pargh, "High-tech functions improve new light switches," Chicago Sun-Times. p. 7, Oct. 7, 1990.
Parks, "The State of Home Systems," The Computer Applications Journal, vol. 25, pp. 12-13, Feb./Mar. 1992.
Parks Associates, Home Systems 94: Home Controls, Parks Associates, Dallas, 1994.
Parks et al., X-10 Ltd. Myths and Reality: The Facts Behind the Company and the Technology, Parks Associates, Dallas, 1994.

Phillips, "Installing a Home Alarm: Protect your property and enjoy extra conveniences with an affordable do-it-yourself system," Home Mechanix, vol. 90, No. 782, p. 60, Feb. 1994.

Price, "Product Development Flow Using Domosys HeadStart Suite," www.hometoys.com/htinews/aug99/articles/domosys/domosys.htm, Aug. 1999.

"Cyberhouse Software Wins Mark of Excellence Award from Home Automation Association," PR Newswire, p. 325, Mar. 25, 1996.

"From start to finish: Molex'Smart House home automation system means quality," Professional Builder, vol. 59, No. 10, p. 18, Oct. 1994.

"Home automation networks links public utility," Professional Builder, vol. 59, No. 7, p. 64, Jul. 1994.

"Home automation & electronics," Professional Builder, vol. 60, No. 2, p. 350, Mid-Jan. 1995.

"Exclusive survey results: Home buyers & the intelligent house," Professional Builder, vol. 60, No. 19, p. 13, Dec. 1995.

Rabbie, title unknown, 1992.

"CEBus Developments," Radio-Electronics, vol. 62, No. 8, p. 4, Aug. 1991.

Remlich, Jr., "Intelligent gas appliances," Appliance Manufacturer, vol. 41, No. 3, p. 63, Mar. 1993.

"RF Locker," at least as early as Jul. 2004.

Rochfort, "Sensory experience," Custom Builder, vol. 9, No. 5, p. S-28, Sep./Oct. 1994.

Ruling, "The Wybron Autopilot," TCI, vol. 29, No. 4, p. 54, Apr. 1995.

Schade, "Convenient Remote-Control Light Switching Saves Energy," Energy & Automation, vol. 9, No. 1, pp. 37-39, Jan./Feb. 1987.

Schade, "Switching of Lighting Installations by Remote Control," Elektrische Energie-Technik, vol. 29, No. 2, p. 18, Jun./Jul. 1984.

Schade, "New Aspects in the Horizontal Power Supply of Lighting Installations," Siemens Power Engineering, vol. 6, No. 4, pp. 238-239, Jul./Aug. 1984.

Schofield, "Home Automation Takes Off: Intellon products support a 'home electronic highway,'" Design News, pp. 84-87, Apr. 10, 1995.

"x-10 is both a Company and the Technology that it developed," www.shed.com/x10.html, at least as early as Jun. 30, 2006.

"Introducing Digital Wireless Lighting and Appliance Control," www.smarthomepro.com, at least as early as Jun. 21, 2004.

"Z-Wave Radio Frequency Wireless Controller," www.smarthomeusa.com, at least as early as Jun. 19, 2004.

"Sophisticated Lighting Control for Your Home," www.smarthome.com, at least as early as Jun. 18, 2004.

"Getting Started," www.smarthome.com, at least as early as Jun. 21, 2004.

"A Full-Featured Dimmer for Every Home!" www.smarthome.com, at least as early as Jun. 21, 2004.

"What is X10?" www.smarthome.com, at least as early as Jun. 21, 2004.

"Automatically Turn On X10 Lights When You Enter the Room?" www.smarthome.com. at least as early as Jun. 18, 2004.

"Control Lights and Appliances from the Comfort of Your Sofa!" www.smarthome.com, at least as early as Jun. 21, 2004.

Stauffer, "The Smart House System," The Computer Applications Journal, vol. 31, pp. 14-23, Feb. 1993.

Strassberg, "Home Automation Buses: Protocols really hit home," EDN, pp. 69-80, Apr. 13, 1995.

Taber, "The Arrival of a World Without Wires," Business for Central New Jersey, vol. 2, No. 3, Section 1, p. 3, Feb. 13, 1989.

Tanenbaum, Computer Networks, Prentice-Hall, Inc., Englewood Cliffs, New Jersey, pp. 144, 271-275, 1989.

"Lighting control (Buyers Guide)," TCI, vol. 28, No. 10, p. 56, Dec. 1, 1994.

Texas Instruments, Chipcon Products from Texas Instruments, 2006.

Teyssier, "BatiBUS: BatiBUS System Design Principles," Jun. 1990.

Uhara et al., "Development of HI (Home Information) Control System," Sharp Technical Journal, vol. 59, pp. 39-42, Aug. 1994.

"Lighting & Appliance Control," www.unitysystemshomemanager.com, at least as early as Jun. 23 2004.

"What is X10?" unknown, at least as early as Jul. 18, 2006.

"X-10 Technology Transmission Theory," unknown, at least as early as Jul. 18, 2006.

Wacks, "The Impact of Home Automation on Power Electronics," IEEE, pp. 3-9, 1993.

Williams, "Brightening Up The House: Latest Technology, Marketing Developments Bring Sophisticated Home Automation Closer to the Masses," Chicago Tribune, p. 1, Mar. 3, 1996.

Winick, "The RF Medium in the Home—The Move to Spread Spectrum," IEEE Transactions on Consumer Electronics, vol. 37, No. 2, pp. 108-115, May 1991.

"Wireless hookups offered through radio technology," UCLA.

"Let There Be Light," www.x10.com/news/articles/0309_light.htm, at least as early as Jul. 18, 2006.

"SuperRemote Home Control Kit," www.x10.com, at least as early as Jun. 18, 2004.

"X10 Powerline Carrier (PLC) Technology," www.x10.com/support/technology1.htm, at least as early as Jun. 30, 2006.

X10PRO, "X10 Platform Basics" at least as early as Jun. 30, 2006.

Yoshida, "LONWorks connects," Electronic Engineering Times, vol. 769, p. 16, Oct. 25, 1993.

Zhonglei et al., "Simultaneous Control Signal and Power Transmission Through Mechanical Rotary Joint Without Wiring Connection," IEEE, pp. 1589-1593, 1996.

* cited by examiner

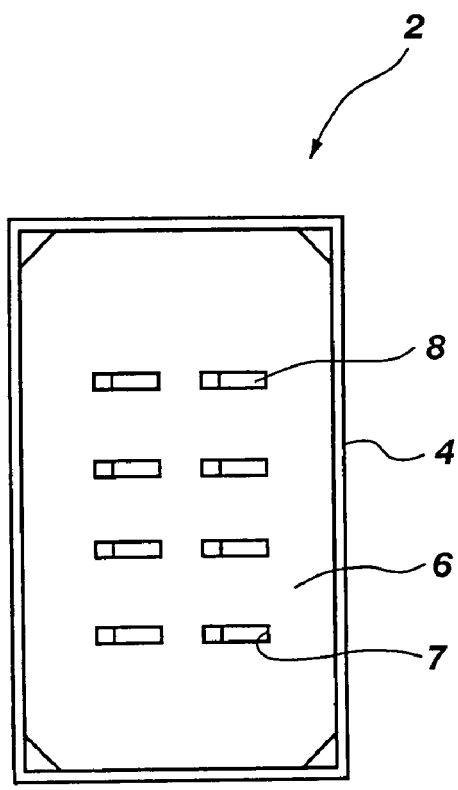 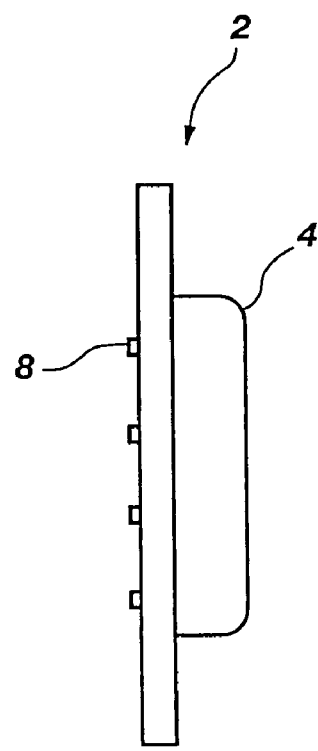
Fig. 1
(PRIOR ART)
Fig. 2
(PRIOR ART)

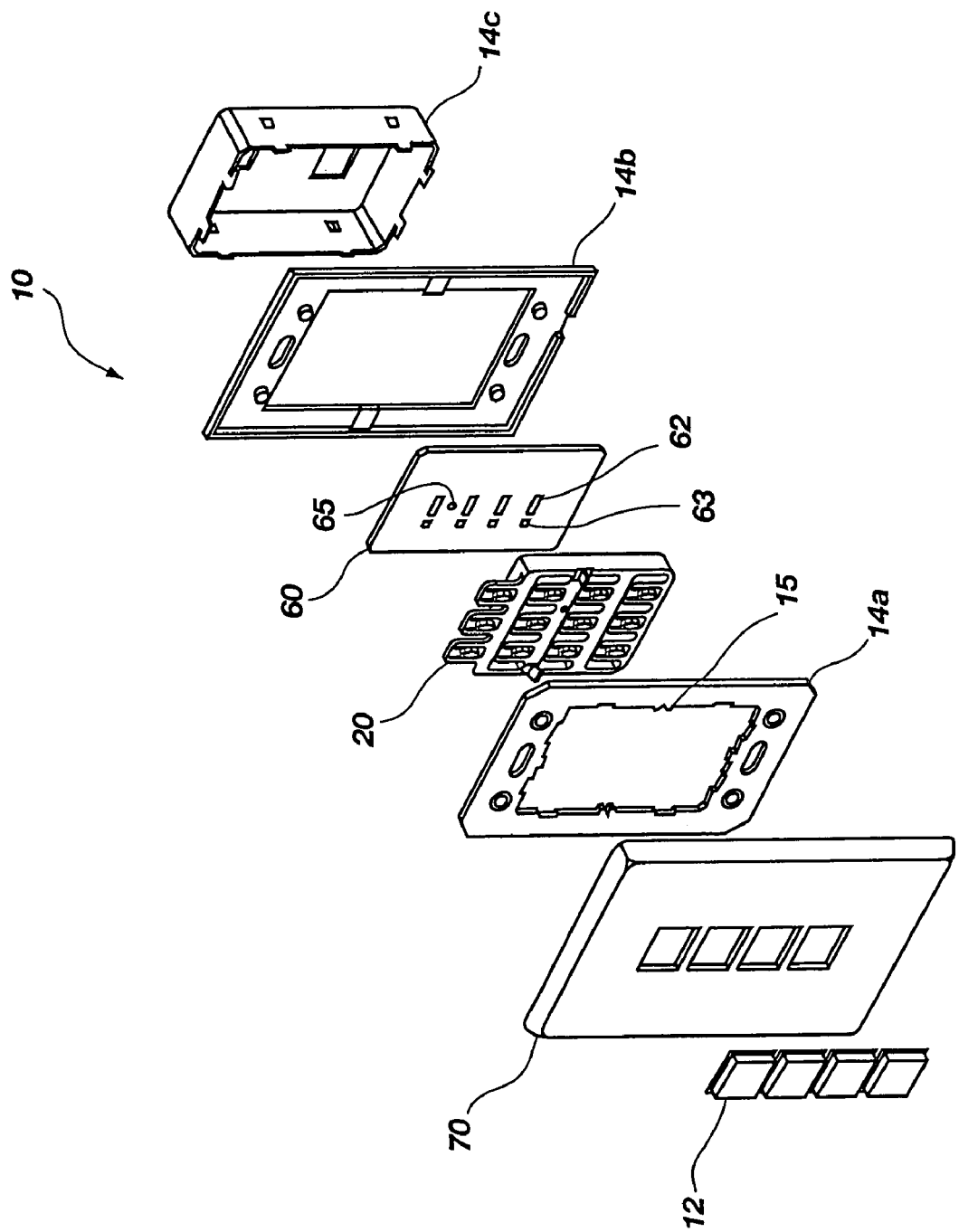

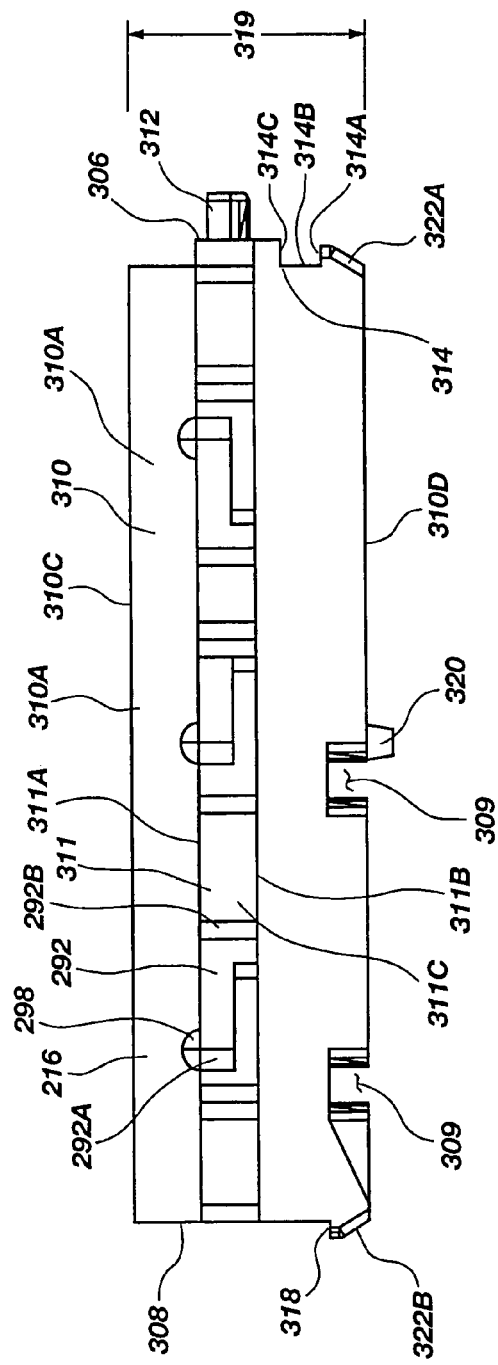
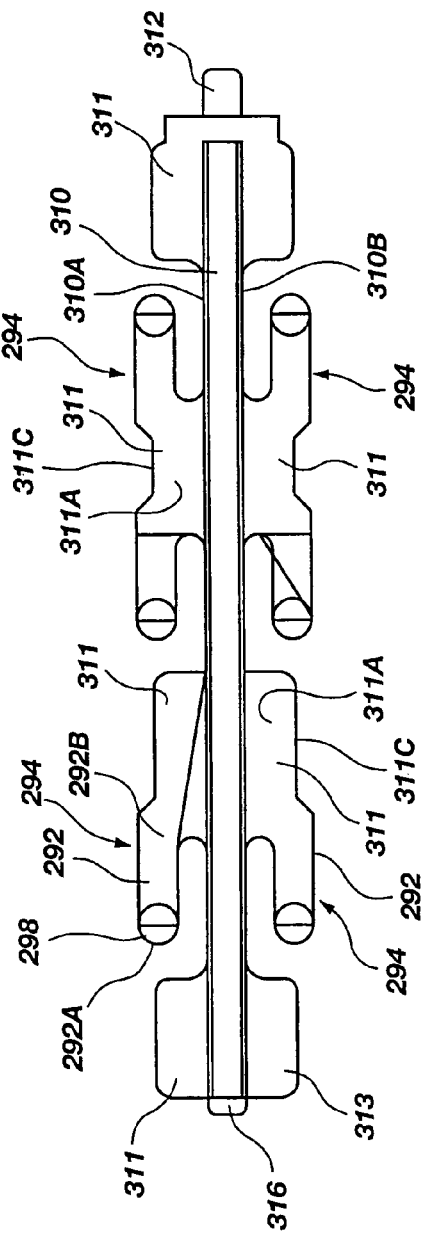
FIG. 21
FIG. 22

BUTTON ASSEMBLY WITH STATUS INDICATOR AND PROGRAMMABLE BACKLIGHTING

CROSS-REFERENCE TO RELATED APPLICATIONS

This application is a divisional of U.S. patent application Ser. No. 10/654,778, filed Sep. 3, 2003, entitled "Button Assembly with Status Indicator and Programmable Backlighting," which is a continuation-in-part of U.S. patent application Ser. No. 10/024,129, filed Dec. 17, 2001, now U.S. Pat. No. 6,660,948, entitled "Switch Matrix," which claimed the benefit of U.S. Provisional Application No. 60/272,020, filed Feb. 28, 2001, all of which are incorporated herein by reference in their entireties, including but not limited to those portions that specifically appear hereinafter, the incorporation by reference being made with the following exception: In the event that any portion of the above-referenced applications is inconsistent with this application, this application supercedes said above-referenced applications.

BACKGROUND

1. The Field of the Invention

The present invention relates generally to keypad devices, and more particularly, but not necessarily entirely, to a switch matrix which allows the use of variable key positions and key sizes on the keypad and to the use of such devices.

2. Background Art

It is common practice to provide keypads consisting of one or more keys arranged for entry of data or performing functions such as activating switches. Keypads are used for various types of electronic devices such as user interfaces for home automation and security systems, calculators, telephones, etc. Keypads commonly include an assembly of various parts maintained in a housing.

For example, FIG. 1 shows a keypad, generally indicated at 2, known in the art for use as a primary control point for automation systems used in areas such as homes, businesses, boats, yachts, motor homes and busses. The keypad 2 includes a plurality of keys 8 which can be depressed to control systems such as lighting, security, audio visual and heating/cooling for example. The keys 8 are connected to electronic circuitry which is contained in a housing 4. The keys 8 are fixed in place by an attaching plate 6 so as to be non-removable from the keypad 2. The attaching plate 6 has apertures 7 through which the keys 8 protrude. The apertures 7 are sized and shaped to accommodate keys 8 of a particular size and shape. Therefore, a different attaching plate 6 is required for each size and shape of keys 8 used for the keypad 2. Furthermore, the location of the keys 8 is confined to the locations of the apertures 7. Therefore, a different attaching plate 6 must be used for different configurations of the keys 8. Moreover, if any of the keys 8 become damaged or require replacement, the entire keypad 2 must be replaced or the attaching plate 6 must be removed. Removal of the attaching plate 6 is a difficult task which may require the services of a professional or use of specialized equipment since the attaching plate 6 is fixed to the housing 4 and is not designed to be easily removed without damaging the attaching plate 6 or the housing 4.

The previously available devices are thus characterized by several disadvantages that are addressed by the present invention. The present invention minimizes, and in some aspects eliminates, the above-mentioned failures, and other problems, by utilizing the methods and structural features described herein.

In view of the foregoing state of the art, it would be an advancement in the art to provide a switch matrix which is capable of being used with keys of different sizes and shapes. It would be a further advancement in the art to provide a switch matrix which allows the keys to be arranged in different configurations using differing numbers of keys. It would also be an advancement in the art to provide a switch matrix which allows the keys to be easily installed and replaced without damaging the matrix.

BRIEF DESCRIPTION OF THE DRAWINGS

The above and other objects, features and advantages of the invention will become apparent from a consideration of the subsequent detailed description presented in connection with the accompanying drawings in which:

FIG. 1 is a front view of a previously available keypad for an automation system.

FIG. 2 is a side view of the keypad of FIG. 1.

FIG. 3 is an exploded perspective view of a keypad showing the switch matrix pursuant to one illustrative embodiment of the present invention.

FIG. 21 is a side view of one illustrative embodiment of a cross member in accordance with the present invention.

FIG. 22 is a top view of the cross member shown in FIG. 21.

DETAILED DESCRIPTION OF THE ILLUSTRATIVE EMBODIMENTS

Figure 6:
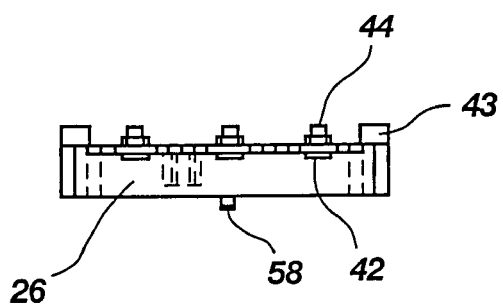
FIG. 6 is an end view of the switch matrix of FIG. 4.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Referring now to FIG. 3, an exploded perspective view of a keypad, generally indicated at 10, is shown including an embodiment of a switch matrix 20 of the present invention. The keypad 10 may be used as a user interface for home automation and security systems, for example. The keypad 10 may include a plurality of keys 12 which can be depressed to control systems such as lighting, security, audio visual and heating/cooling for example. However, it will be appreciated by those skilled in the art that the keypad 10 may be used in other environments within the scope of the present invention. Other such environments include calculators, telephones, and office equipment, for example.

A housing assembly 14 for the keypad 10 may be configured in various forms. The housing assembly 14 is shown in FIG. 3, as a combination of a front plate 14a, a back plate 14b and a back box 14c, which can be joined together in any suitable manner well known to those skilled in the art. The housing assembly 14 may receive electronic control devices such as electronic circuitry board 60 containing switches 62 which can be activated to perform a particular function. Any number of different types of electronic circuitry boards 60 can be utilized within the scope of the present invention and such electronic circuitry boards 60 can readily be arrived at by those skilled in the pertinent art. Switches 62 may be of any variety known in the art which are activated by a mechanical action such as a pressing force. For example, switches 62 may include resilient members which are deflected by a force to close a circuit, and upon release of the force, the resilient members rebound to open the circuit. The electronic circuitry board 60 may be attached to the housing assembly 14 in any suitable manner known in the art such as soldering, adhesives or fasteners, for example. The switch matrix 20 may be attached to the housing assembly 14, as described more fully below, such that keys 12 may be attached to the switch matrix 20 to correspond to the location of the switches 62. A face plate 70 may cover the switch matrix 20 to improve the appearance of the keypad 10 and to provide further protection of the contents of the housing assembly 14. The face plate 70 may be attached to the housing assembly 14 in any manner known in the art such as magnets or fasteners, for example.

Figure 4:
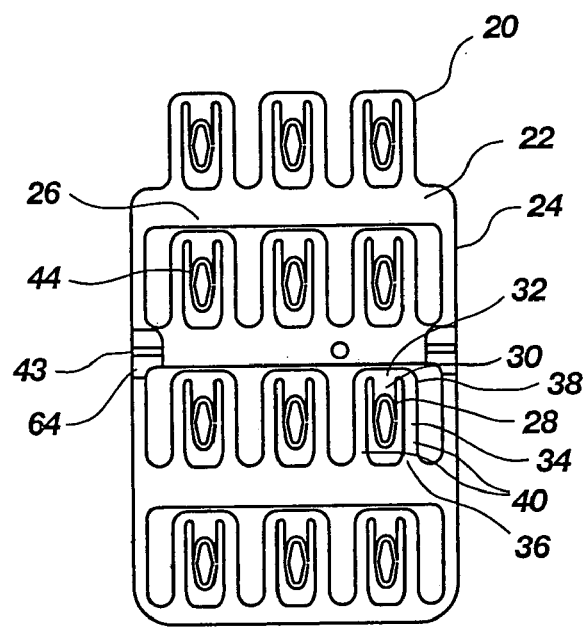
FIG. 4 is a plan view of an illustrative embodiment of the switch matrix of the present invention.

Referring now to FIG. 4, a plan view of an embodiment of the switch matrix 20 is shown. The switch matrix 20 may include a support frame 22. The support frame 22, may include at least one longitudinal member 24 and at least one lateral member 26 which, in the illustrated embodiment, are substantially perpendicular to each other. More preferably, the support frame 22 includes two longitudinal members 24 and a plurality of lateral members 26 arranged to support a grid of key positioning members 28. The key positioning members 28 may include a first cantilever 30 having an attached end 32, shown most clearly in FIG. 11. The attached end 32 of the first cantilever 30 may be attached to a free end 38 of a second cantilever 34. The second cantilever 34 may be disposed on the support frame 22 at a fixed end 36 and includes a pair of spaced apart arms 40 such that the first cantilever 30 may reside between the arms 40 and parallel to the arms 40. The configuration of the first cantilever 30 and the second cantilever 34 allows for improved deflection and force transfer capabilities in that the key positioning member 28 allows for deflection in a substantially linear direction. For example, the first cantilever 30 may deflect in a curved path 31 with respect to the attached end 32. Whereas the second cantilever 34 deflects in a oppositely curved path 33 with respect to the fixed end 36 of the second cantilever 34. The opposite curvature of curved path 31 of the first cantilever 30 and the curved path 33 of the second cantilever 34, tend to reduce the amount of curvature in travel path of the key positioning member 28 such that deflection of the key positioning member 28 takes place in a substantially linear direction.

Figure 7:
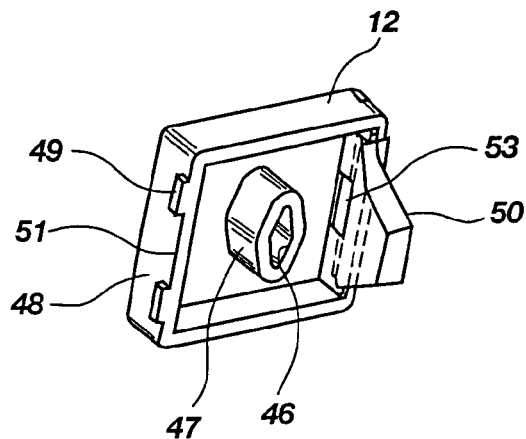
FIG. 7 is a bottom perspective view of an exemplary embodiment of a key used in conjunction with the switch matrix of the present invention.
Figure 11:
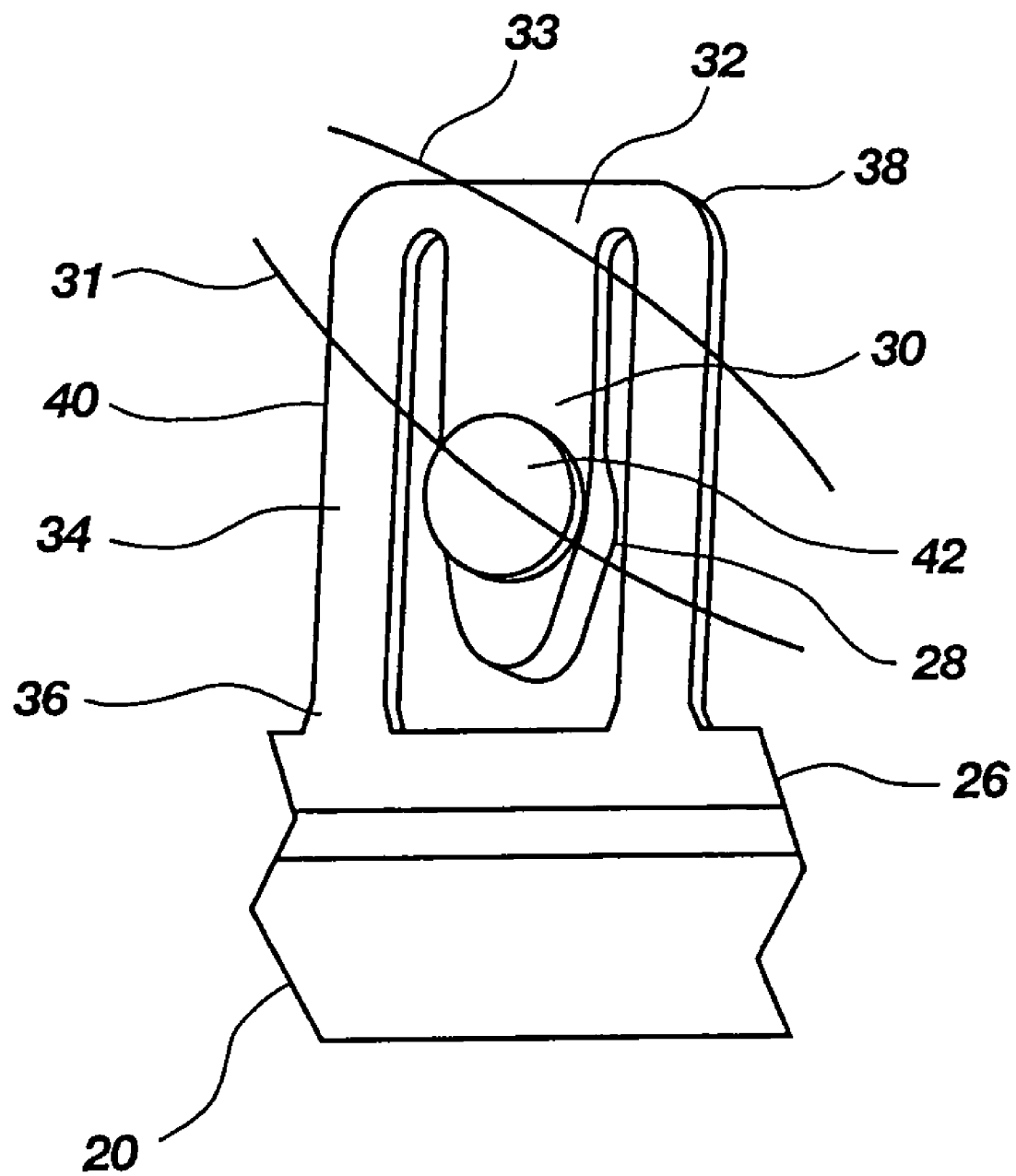
FIG. 11 is a break-away perspective bottom view of a cantilever system of the switch matrix of FIGS. 3-6.

A switch activating protrusion 42, shown in FIGS. 6 and 11, may be disposed on a bottom side of the first cantilever 30. The switch activating protrusion 42 is configured to contact the switch 62 (see FIG. 3) as the first cantilever 30 is depressed. The upper side of the first cantilever 30 may include a knob 44 which may be inserted into an opening 46 defined by a sidewall 47 of the key 12, as shown in FIG. 7. The knob 44 and opening 46 are may be sized to create a compression or friction fit between the key 12 and the knob 44 such that the key 12 is held tightly in place. However, the key 12 is not permanently fixed to the knob 44 such that the key 12 may be removed from the knob 44 if desired. The knob 44 is one example of a key attaching means. Other means for removably attaching a key 12 to the switch matrix 20 may be used within the scope of the present invention. For example, the knob 44 may be located on the key 12 and the opening 46 may be located on the switch matrix 20.

It will be appreciated that the structure and apparatus disclosed herein is merely one example of a key attaching means for removably attaching a key to the switch matrix, and it should be appreciated that any structure, apparatus or system for removably attaching a key to the switch matrix which performs functions the same as, or equivalent to, those disclosed herein are intended to fall within the scope of a means for removably attaching a key to the switch matrix, including those structures, apparatus or systems for removably attaching a key to the switch matrix which are presently known, or which may become available in the future. Any structure which functions the same as, or equivalently to, the herein described means for removably attaching a key to the switch matrix falls within the scope of this element as set forth in the claims.

The knob 44 (FIG. 6) may have a diamond shape, for example, which corresponds to the opening 46 also having a diamond shaped and provided in the key 12. As those skilled in the art will appreciate, knobs 44 and openings 46 of other shapes, and other structures to removably attach the key 12 to the switch matrix 20, may be used within the scope of the present invention. Furthermore, the size and shape of the key 12 is not dependant upon the means for removably attaching the key 12 to the switch matrix 20. In the prior art system shown in FIG. 1, the apertures 7 of the attaching plate have a size and shape configured for specific keys, whereas the switch matrix 20 of the present invention advantageously allows keys 12 of various sizes and shapes to be attached. Those skilled in the art will appreciate that advantages which the present invention provides by allowing different number of keys and different sizes and shapes of keys to be utilized.

Figure 5:
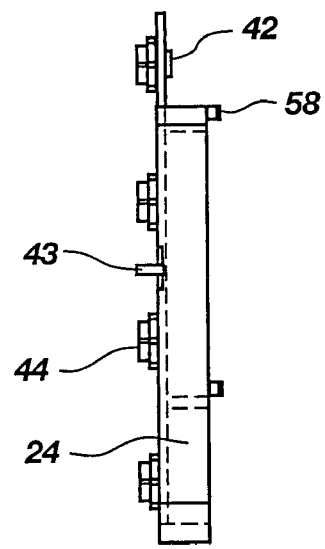
FIG. 5 is a side view of the switch matrix of FIG. 4.

The switch matrix 20 may also include abutments 43 on opposing sides of the support frame 22, as shown most clearly in FIGS. 4-6. The abutments 43 may project from the switch matrix 20 to contact the face plate 70 to prevent the face plate 70 from flexing into the knobs 44. The abutments 43 may therefore prevent activation of the switches 62 due to forces applied to the face plate 70.

Figure 8:
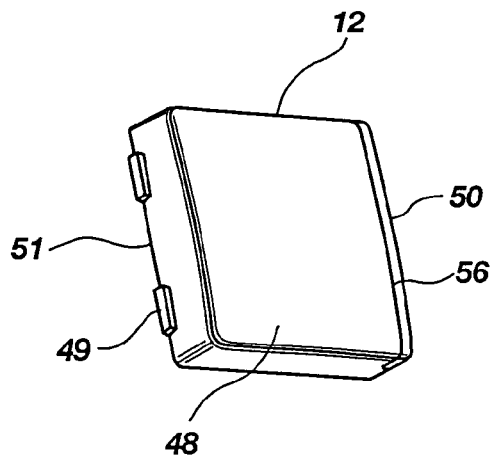
FIG. 8 is a top perspective view of the exemplary embodiment of the key of FIG. 7.

FIGS. 7 and 8 show an exemplary embodiment of the key 12. Many different variations of key 12 may be formed utilizing various sizes and shapes in addition to those shown in the figures. For example, the keys 12 may be round, triangular, oval, polygonal, or in the shape of objects such as arrows, waves or light bulbs or any other shape. Preferably, keys 12 include a key body 48 and a light pipe 50. The key body 48 provides a surface area which can be depressed by a human user to activate the switch 62 (see FIG. 3). The key body 48 may also be engraved or labeled to provide an indication of the function of the key 12. The key 12 may further include one or more stops 49 to prevent the key 12 from passing through the faceplate 70. The stops 49 may be segmented or continuous around a bottom edge 51 of the key 12.

The light pipe 50 may be made of a translucent material which directs light from a light source 63 (see FIG. 3) located below the key 12 to the upper surface 56 of the key 12. Thus the light pipe 50 allows the transmission of light from the electronic circuitry board 60 to the upper surface 56 of the key 12 to provide visual signals to the user. The light pipe 50 may be attached to the key body 48 without the use of adhesive or tools. For example, the light pipe 50 may have a projection (not shown) which may be inserted into a cavity (not shown) in the key body 48 such that the light pipe 50 is held to the key body 48 through friction. The key body 48 may be configured with cut-out portions, such as. depicted at 53 in FIG. 7, to reduce the amount of material required to manufacture the key body 48 where possible.

The light source 63 may be located on the electronic circuitry board 60 in close proximity to the switches 62 as shown in FIG. 3. The light source 63 may include one or more light emitting diodes, for example. The light source 63, in accordance with the principles discussed elsewhere herein, may utilize a single color or multiple colors, and may be programmed to blink, change colors, or vary in illumination intensity to indicate the status of the keypad 10. It will be appreciated that other devices for generating light may be used within the scope of the present invention.

The switch matrix 20 also may include aligning posts 58, as shown in FIGS. 5 and 6, which extend from an undersurface of the switch matrix 20 to register with recesses 65 on the electronic circuitry board 60 (FIG. 3). The aligning posts 58 align the switch matrix 20 so that the switch activating protrusions 42 register properly with the switches 62. It will be appreciated that other structures may be used within the scope of the present invention to align the switch matrix 20 with the electronic circuitry board 60.

The switch matrix 20 also may include grooves 64 disposed in the support frame 22. The grooves 64 may be configured to receive tabs 15 (see FIG. 3) located on the housing assembly 14 to hold the switch matrix 20 in place with respect to the housing assembly 14. It will be appreciated by those skilled in the art that other structures besides the grooves 64 and the tabs 15 may be used within the scope of the present invention to hold the switch matrix 20 in place with respect to the housing assembly 14.

The switch matrix 20 may be formed as a single piece from molded plastic. However, as those skilled in the art will appreciate, other materials may be used to form the switch matrix 20 within the scope of the present invention.

Figure 9:
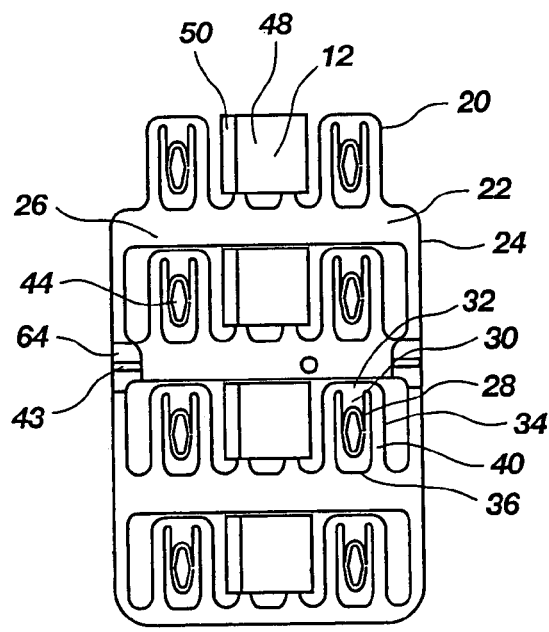
FIG. 9 is a plan view of an exemplary embodiment of one of many key configurations made possible by the switch matrix of the present invention.

In use, keys 12 are attached to any or all of the key positioning members 28 to correspond with the position of the switches 62 on the electronic circuitry board 60. An exemplary configuration of the keys 12 on the switch matrix 20 is shown in FIG. 9. It will be appreciated that numerous different configurations of keys 12 are possible in addition to that shown in FIG. 9. A key 12 may be so large as to cover multiple key positioning members 28, or small enough such that a key 12 may be attached to all key positioning members 28. Furthermore, the switch matrix 20 may be constructed to contain any different number of key positioning members 28 such that the number of possible key configurations is very large. The keys 12 may be attached to the switch matrix 20 in a desired configuration without the need for making modifications to the switch matrix 20. Therefore, the switch matrix 20 can be more easily installed at a location in the field where the switch matrix 20 is being installed since the need for specialized tools or equipment, as required by the prior art, is eliminated. Furthermore, the switch matrix 20 is adapted for numerous different key configurations so a single switch matrix 20 can be used in the place of multiple attaching plates 6 as required by the prior art for different key configurations.

If the need arises to repair or replace a key 12, the key 12 may simply be detached from the switch matrix 20 by pulling on the key 12 with sufficient force to overcome the compression fit between the knob 44 and the opening 46. This can be done without removing the switch matrix 20 from the housing assembly 14, and without damaging the switch matrix 20. The ease with which the keys 12 may be replaced allows users to maintain and repair the keys 12 without the need for purchasing a new keypad 10, obtaining specialized tools or hiring a technician to perform the work.

Figure 10:
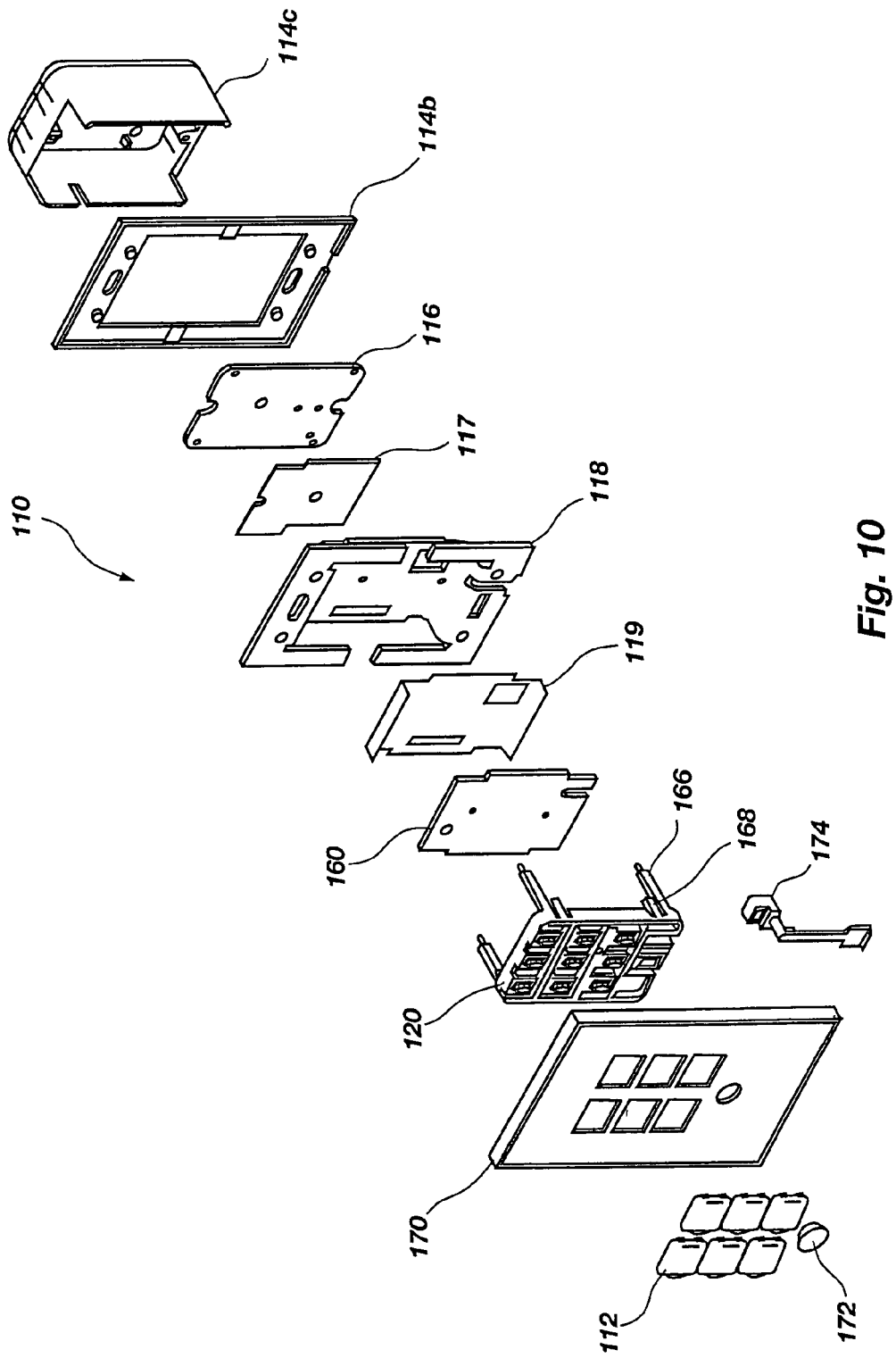
FIG. 10 is an exploded perspective view of an alternative illustrative embodiment of the switch matrix in a different keypad environment.

Reference will now be made to FIG. 10 to describe a second illustrative embodiment of the present invention. As previously discussed, the embodiments of the invention illustrated herein are merely exemplary of the possible embodiments of the invention, including that illustrated in FIG. 10.

It will be appreciated that the second illustrative embodiment of the invention illustrated in FIG. 10 contains many of the same structures represented in FIGS. 1-9 and only the new or different structures will be explained to most succinctly explain the additional advantages which come with the illustrative embodiment of the invention illustrated in FIG. 10. The second illustrative embodiment of the inventive switch matrix 120 is shown in a different keypad environment 110. The second illustrative embodiment of the switch matrix 120 may include legs 166 to support and align the switch matrix 120 within the keypad 110. The switch matrix 120 also may include clips 168 to attach the switch matrix 120 to other components of the keypad 110. Other components of the keypad 110 may include a back box 114c, a back plate 114b, an additional printed circuit board 116, a first insulator 117, a bracket 118 and a second insulator 119. The keypad 110 may also include an optional input unit 172. The optional input unit 172 may include a built in infrared receiver which may allow a user to transmit commands to the keypad 110 from a remote location. The keypad 110 may also have a service switch lever 174 for performing functions such as cutting the flow of electricity in the keypad 110. It will be appreciated that numerous other configurations of components of the keypad 110 may be used within the scope of the present invention. The components of the keypad 110 illustrated in FIG. 10 are merely exemplary of the numerous environments in which the switch matrix 120 may be utilized.

Figure 12:
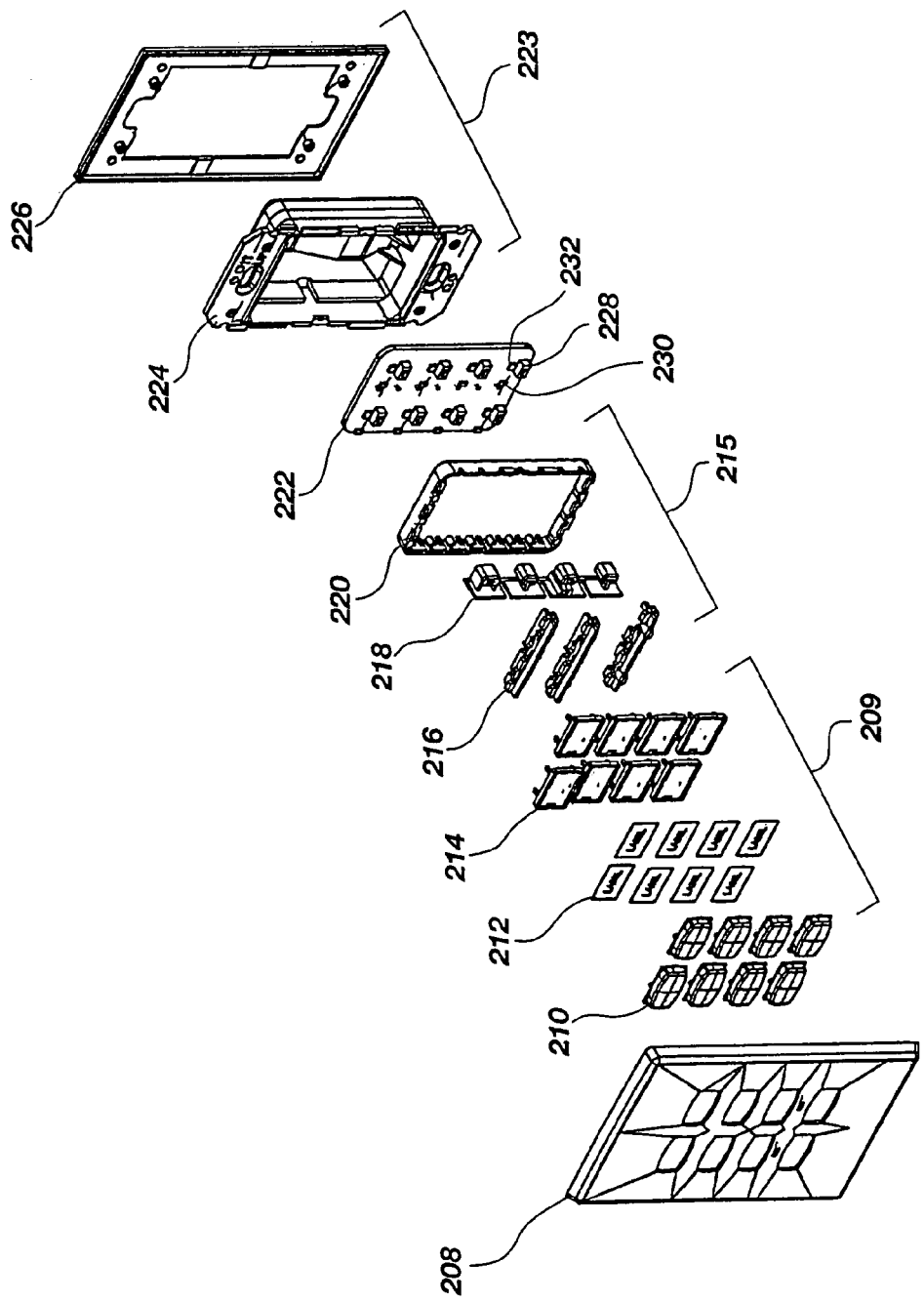
FIG. 12 is an exploded perspective view of a keypad showing the configurable switch matrix assembly pursuant to another illustrative embodiment of the present invention.

Referring now to FIG. 12, an exploded perspective view of an illustrative keypad, generally indicated at 200, is provided. The keypad 200 may be used as a user interface for home automation and security systems, for example, but also have application in many different settings including commercial automation systems, a variety of control systems, and any other setting where control of an electrical device is desired. The keypad 200 may include a plurality of button assemblies 209, each individual button assembly 209 comprising a lens 210, a label 212, and a base 214. Each button assembly 209 can be depressed to control systems such as lighting, security, audio visual and heating/cooling, for example. However, it will be appreciated by those skilled in the art that the keypad 200 may be used in many other environments within the scope of the present invention. Other such environments include calculators, telephones, and office equipment, for example.

The keypad 200 may also comprise a faceplate 208 and a housing assembly 223 comprising a back box 224 and a back plate 226. The faceplate 208 may be of varying styles, but should have an equal number of orifices to correspond to the number of button assemblies 209. The back box 224 and back plate 226 may assist in mounting the keypad 200.

The housing assembly 223 can be joined together in any suitable manner well known to those skilled in the art. The housing assembly 223 may receive electronic control devices such as an electronic circuitry board 222. Any number of different types of electronic circuitry boards 222 can be utilized within the scope of the present invention and such electronic circuitry boards 222 can readily be arrived at by those skilled in the pertinent art using the disclosure provided herein.

The illustrative electronic circuitry board 222 may comprise a plurality of switches, one of which is shown at 228, status lights, one of which is shown at 230, and back lights, one of which is shown at 232. The switches 228 may be of any variety known in the art which are activated by a mechanical action such as a pressing force, or alternatively via proximity. For example, switches 228 may include resilient members or plungers which are deflected by a force to close a circuit, and upon release of the force, the resilient members rebound or plunger to open the circuit. The electronic circuitry board 222 may be attached to the housing assembly 223 in any suitable manner known in the art such as soldering, adhesives or fasteners, for example.

Each button assembly 209 may have its own associated status lights 230 and back lights 232. The status lights 230 and back lights 232 may comprise one or more light sources, such as a light emitting diode (LED), as will be explained below. Further, it is not required by the present invention that a button assembly have associated status lights 230 and back lights 232, but such structures are advantageously included in the illustrative embodiments.

The keypad may also comprise a configurable switch matrix assembly 215 on which the button assemblies 209 may be removably attached. As described herein, the configurable switch matrix assembly 215 may be configured for a plurality of configurations, each of the configurations comprising a different button pattern.

The configurable switch matrix assembly 215 may comprise one or more positionable cross members 216 removably attached to a frame 220. In addition, the configurable switch matrix assembly 215 also comprises a positionable baffle 218. The configurable switch matrix assembly 215 may be adapted to receive the button assemblies 209 such that the corresponding switches 228 on the electronic circuitry board 222 are in proper alignment.

Figure 12A:
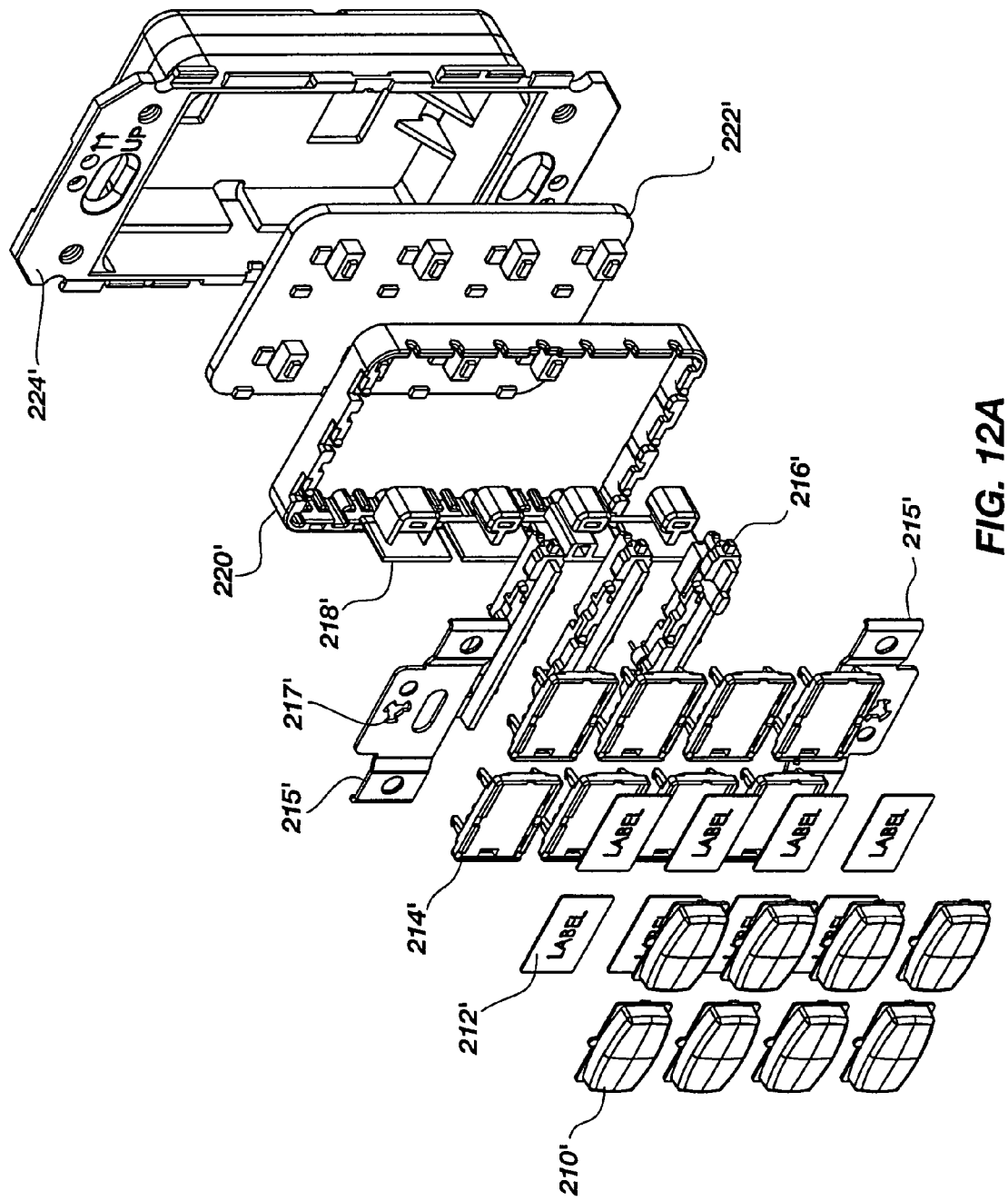
FIG. 12A is an exploded perspective view of a keypad, different in significant ways from the keypad shown in FIG. 12, showing yet another configurable switch matrix assembly pursuant to the present invention.

Referring now to FIG. 12A, an exploded perspective view of another illustrative keypad, generally indicated at 200', is provided. The keypad 200' has overall similarities to the keypad 200 represented in FIG. 12 but includes some significant differences. The keypad 200' includes a plurality of lenses, one shown at 210', a plurality of labels, one shown at 212', and a plurality of bases, one shown at 214'.

The structure represented in FIG. 12A provides an back box 224' to which is attached a faceplate locking structure 215' which provides a secure and aesthetically pleasing structure to holding the faceplate in place. A recess 217' provided in the faceplate locking structure receives a clip on the faceplate (not explicitly represented in FIG. 12A) to secure the faceplate in place.

Also shown in FIG. 12A are positionable cross members 216' which are removably attached to a frame 220' and a positionable baffle 218', in a manner similar to that described in connection with the structure represented in FIG. 12. An electronic circuitry board 222' is also represented in FIG. 12A.

In the following discussion reference will be made to FIGS. 13 and 14. The illustrative lens 210 may comprise an extended portion 239, a viewing surface 240, a lip 241, and a bottom surface 250. The lens 210 is preferably made from a transparent material, such as plastic or glass, whereby light from status lights 230 or back lights 232 (FIG. 12) may illuminate the viewing surface 240. The extended portion 239 extends from the lip 241 to a predetermined height, shown by dimension 243 which is best shown in FIG. 14. The height should be sufficient to allow the viewing surface 240 of the lens 210 to be depressed and observed by a human being when the faceplate 208 is in place in the assembled keypad 200. The extended portion 239 may also comprise a rounded upper portion 252 connecting the extended portion 239 to the viewing surface 240.

Figure 13:
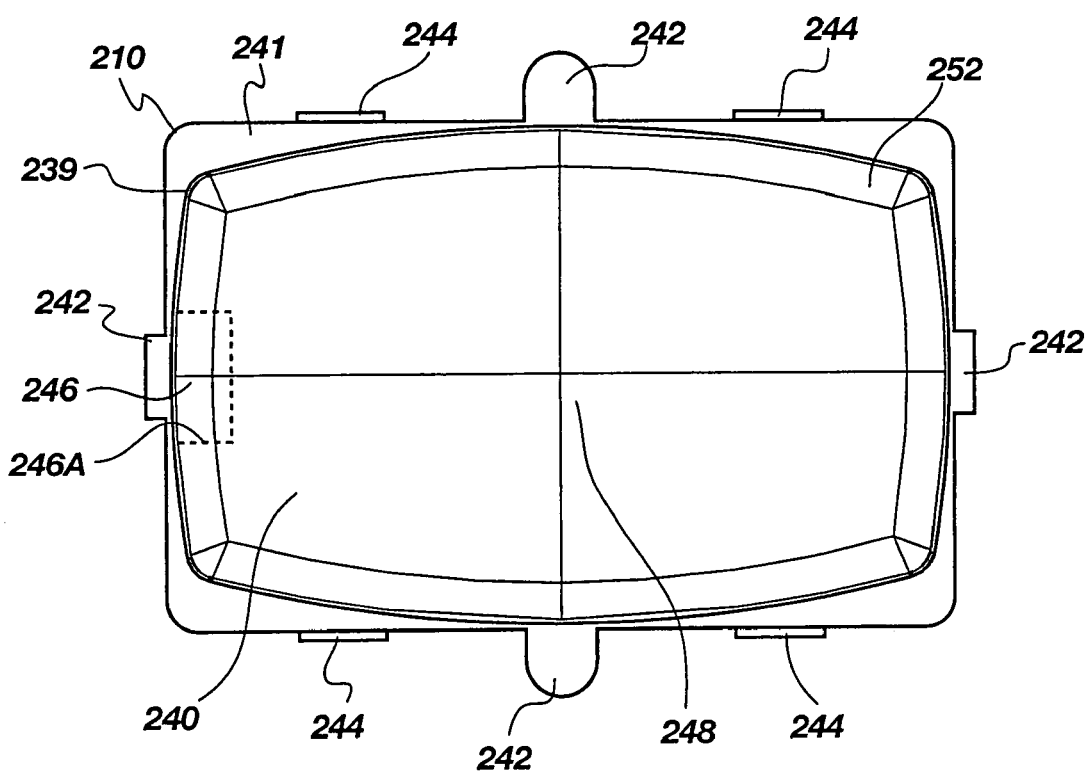
FIG. 13 is a top view of an exemplary lens pursuant to one illustrative embodiment of the present invention.
Figure 14:
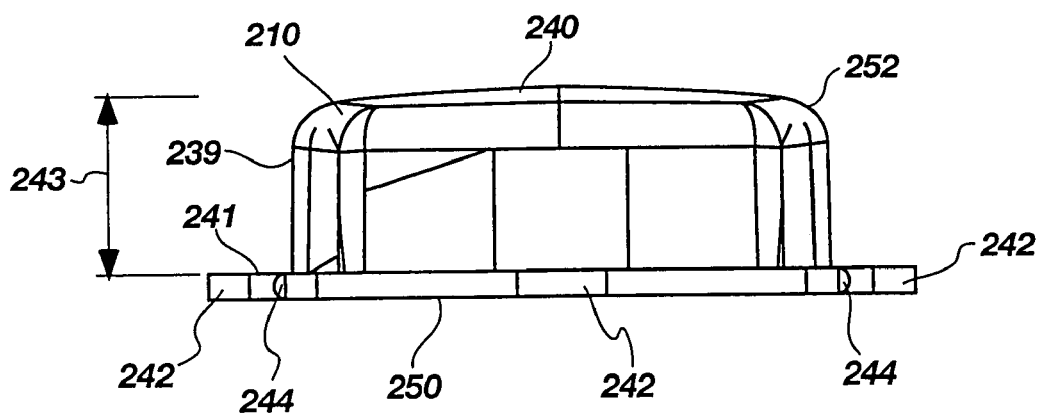
FIG. 14 is a side view of the exemplary lens shown in FIG. 13.

The viewing surface 240 of the lens 210 may be divided into two or more regions best seen in FIG. 13. A status region 246 is generally shown by the area enclosed by the dotted lines and marked with reference 246A. The remaining area on the viewing surface 240 represents the label region 248. The status region 246 is the general area on the lens viewing surface 240 where a light from the status lights 230 may be observed. The label region 248 is the general area on the viewing surface 240 where the illumination from the back lights 232 may be observed. The portion of lens viewing surface 240 over the status region 246 may be frosted to increase visibility of the radiation emitted from the status light 230 (FIG. 12).

It will be appreciated that it may be desirable to illuminate the status region 246 in a manner different from that of the label region 248, including differing attributes of light intensity, diffusion and color. The status region 246 (FIG. 13) is illustratively formed directly over the status lights 230 (FIG. 12). The radiation from the status lights 230 may further be directly channeled to the status region 246 without impediment to create a bright spot which is primarily, or entirely, confined to the status region 246. By observing the status region 246, in accordance with one illustrative embodiment of the present invention, an observer will be able to ascertain the status of the load or electrical device controlled by depressing each of the lens 210 in the button assembly 209.

In addition, the lens 210 may provide magnification such that the label 212 can be more easily observed. Text or symbols provided on the label 212 may be enlarged with magnification for easier reading by a user. Magnification may be accomplished by adding a slight curvature to the viewing surface 240, as shown best in FIG. 14. This curvature magnifies the indicia provided on the label 212.

It should also be noted that the shape of the button assembly 209 can be any shape desirable, for example any number of geometric shapes. The shape of any button assembly 209 or parts thereof described herein, however, should not be considered limiting in any way on the scope of the present invention.

Protruding from the lip 241 are guides 242 and tabs 244 (FIG. 13). The guides 242 are used for alignment with the base 214 to which the lens 210 is attached. The tabs 244 are used for releasably attaching the lens 210 to the base 214 as will be explained below. The tabs 244 are slightly rounded as can be seen in FIG. 14 to facilitate releasably attaching the lens 210 to the base 214.

Figure 15:
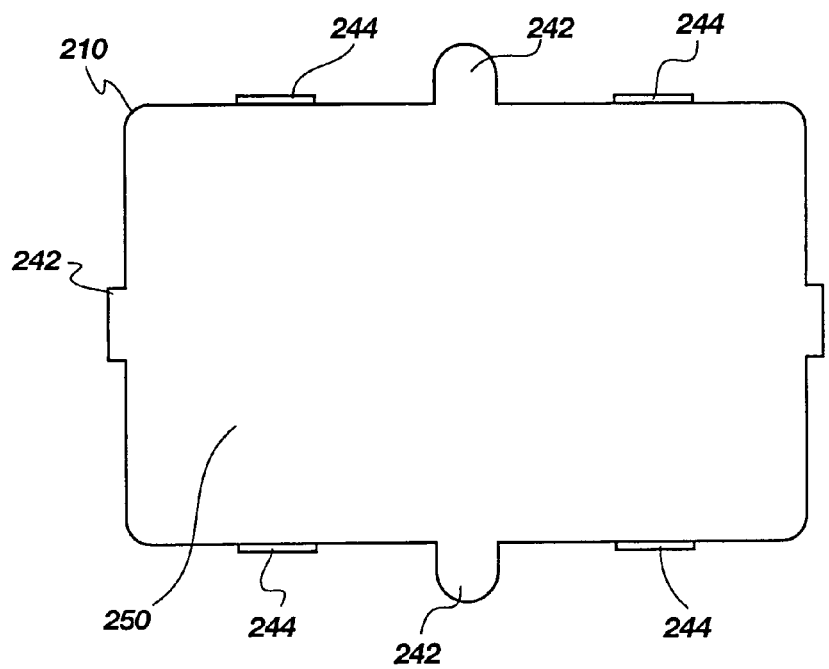
FIG. 15 is a bottom view of the exemplary lens shown in FIGS. 13 and 14.

A back view of the lens 210 represented in FIGS. 13 and 14 is provided in FIG. 15. The bottom surface 250 is substantially flat. The label 212 may contact the bottom surface 250 when the button assembly 209 is assembled. The guides 242 and tabs 244 can also be seen in FIG. 15.

Figure 16:
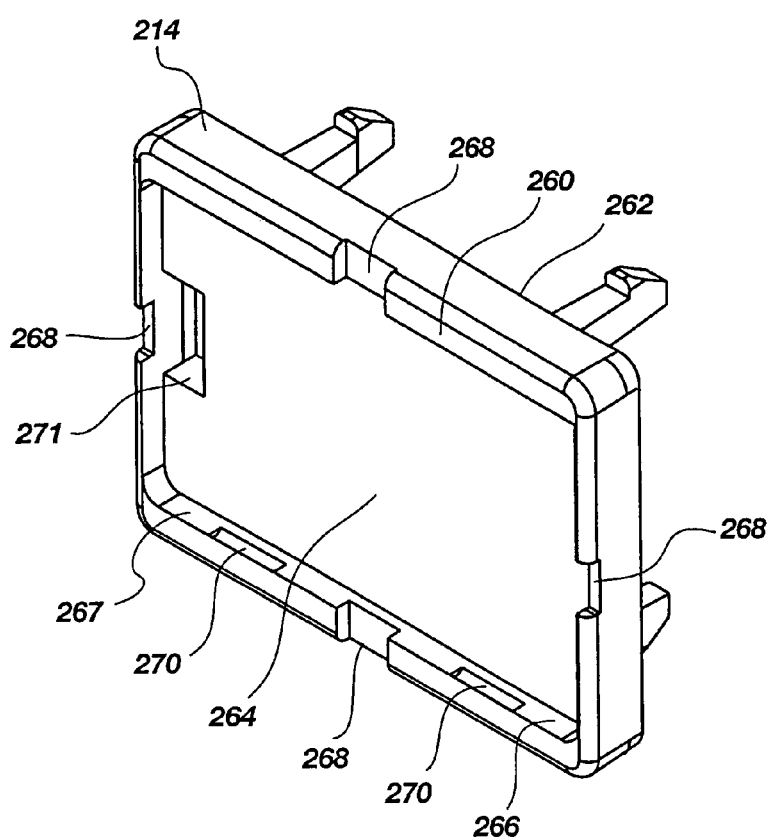
FIG. 16 is a perspective view of an exemplary base configured pursuant to one illustrative embodiment of the present invention.

One illustrative embodiment of a base 214 is depicted in FIG. 16. The base 214 is substantially rectangular in shape having a top surface 260 and a bottom surface 262. The top surface 260 comprises a recessed portion 264 of approximately the same size as the bottom surface 250 of the lens 210.

The recessed portion 264 may serve to receive the label 212 (FIG. 12). Around the perimeter of the recessed portion 264 is a wall 266 having an inner surface 267. Formed in the wall 266 and top surface 260 are cutouts 268. The cutouts 268 are shaped to receive the guides 242 (FIG. 15) on the lip 241 of the lens 210 (FIGS. 13-14) when the lens 210 is properly oriented with respect to the base 214 (FIG. 16).

Grooves 270 corresponding in size, number and position to the tabs 244 (FIGS. 14-15) on the lens 210 are present in the inner surface 267 of the wall 266. The grooves 270 comprise a depression that do not extend through the wall 266 in the illustrative embodiment but can extend through the wall in alternative embodiments. A passage 271 formed in the recessed portion 264 (FIGS. 16-17) allows light from a status light 230 (FIG. 12) to pass unimpeded through the base 214 to the status region 246 (FIG. 13) on the viewing surface 240 of the lens 210. The passage 271 extends from the bottom surface 262 of the base 214 the top surface 260.

Figure 17:
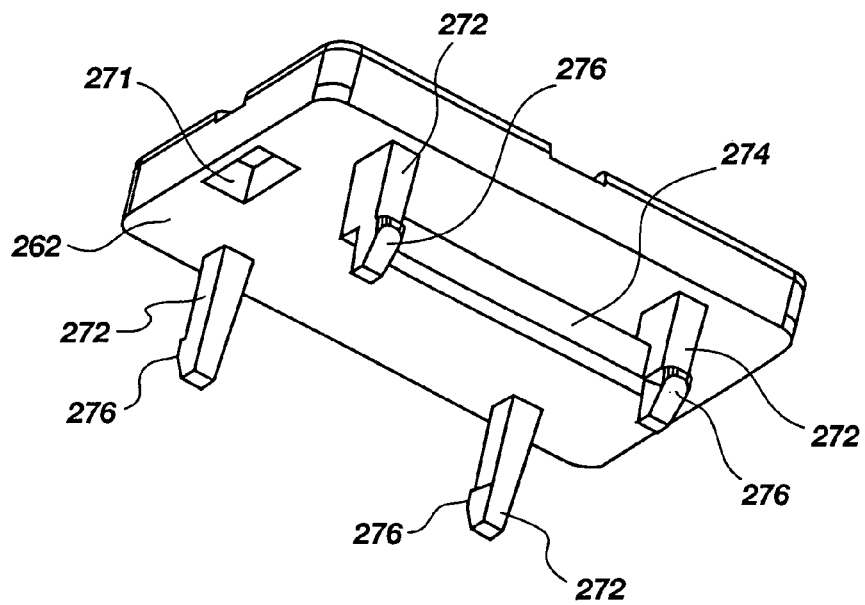
FIG. 17 is a bottom view of the exemplary base shown in FIG. 16.

Referring now to FIG. 17, four legs 272 extend in a substantially outwardly manner from the bottom surface 262 of the base 214. Connecting two of the legs 272 is a cross support 274 which in the illustrated embodiment may also serve as an actuator but many other structures can be utilized in accordance within the scope of the present invention. Located on the end of each of the legs 272 is an engagement member 276. The engagement member 276 comprises a substantially perpendicular extension from the leg 272, but many other structures can also provide the same function. The four legs 272 and engagement members 276 movably couple the button assembly 209 (FIG. 120) to the configurable switch matrix assembly 215 or any other structure, if desired.

The base 214 (FIG. 16) may also serve to diffuse light from the back lights 232 (FIG. 12) so that it is evenly dispersed through the label 212. The base 214 may be comprised of a material that diffuses the light as it passes through the base 214, such as plastic, so that, for example, the illumination from the back lights 232 is evenly dispersed. The base 214 may comprise a frosted portion to further diffuse the light. It will be appreciated that the described structures prevent concentrated bright spots from appearing directly over the back lights 232 when viewing the label 212 through the lens 210. It will be appreciated that the structure and apparatus disclosed herein is merely one example of a means for diffusing light, and it should be appreciated that any structure, apparatus or system for diffusing light which performs functions the same as, or equivalent to, those disclosed herein are intended to fall within the scope of the recited means for diffusing light, including those structures, apparatus or systems for diffusing light which are presently known, or which may become available in the future. Any structure which functions the same as, or equivalently to, a means for diffusing light falls within the scope of such element.

Figure 18A:
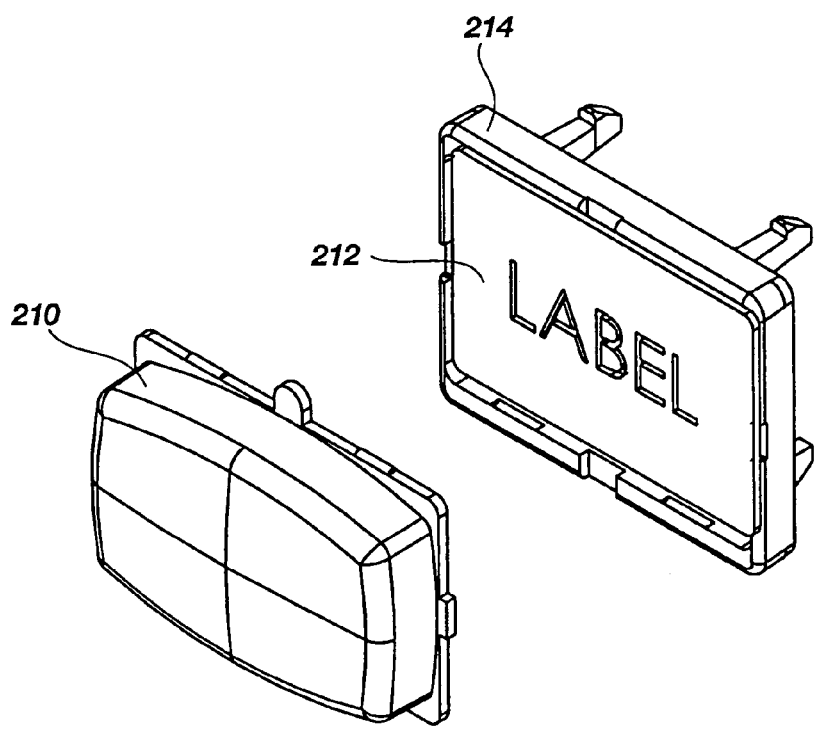
FIG. 18A is a partially exploded perspective view of an exemplary button assembly pursuant to another illustrative embodiment of the present invention.
Figure 18B:
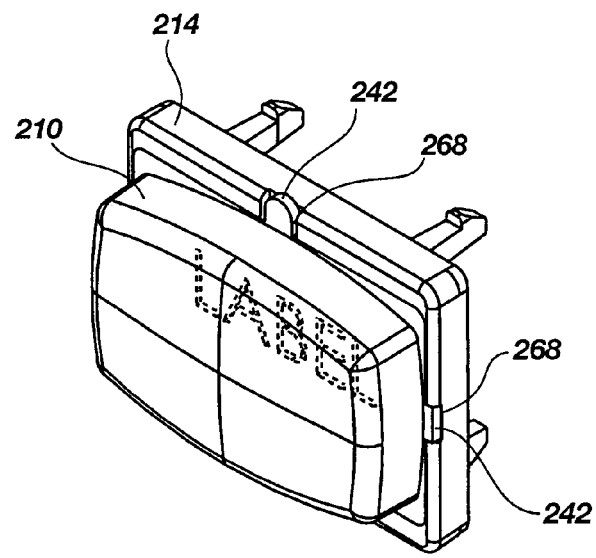
FIG. 18B is a unexploded perspective view of the exemplary button assembly shown in FIG. 18A.

FIG. 18A provides a detailed view of the label 212 (several of which are illustrated in FIG. 12) inserted into the recessed portion 264 of the base 214 with a lens 210 oriented for assembly. An assembled button assembly 209 is illustrated in FIG. 18B. The guides 242 of the lens 210 engage the cutouts 268 on the base 214. The label 212 is held in place between the bottom surface 250 of the lens 210 and the recessed portion 264 of the top surface 260 of the base 214. While not explicitly shown in the figures, the button assembly 209 is held coupled by the tabs 244 of the lens 210 by a snap fit into the grooves 270 of the base 214. Likewise, the button assembly 209 can be disassembled by unsnapping the tabs 244 from the grooves 270. In this manner a label 212 may be readily replaced when desired.

It will be appreciated that the structure and apparatus disclosed herein is merely one example of a means for holding a label, and it should be appreciated that any structure, apparatus or system for holding a label which performs functions the same as, or equivalent to, those disclosed herein are intended to fall within the scope of a means for holding a label, including those structures, apparatus or systems for holding a label which are presently known, or which may become available in the future. Any structure which functions the same as, or equivalently to, a means for holding a label falls within the scope of this element.

It will also be appreciated that the structure and apparatus disclosed herein is merely one example of a means for releasably coupling the lens and base together, and it should be appreciated that any structure, apparatus or system for releasably coupling the lens and base together which performs functions the same as, or equivalent to, those disclosed herein are intended to fall within the scope of a means for releasably coupling the lens and base together, including those structures, apparatus or systems for releasably coupling the lens and base together which are presently known, or which may become available in the future. Any structure which functions the same as, or equivalently to, a means for releasably coupling the lens and base together falls within the scope of this element.

It should also be noted that the base 214 may accept several different styles of lenses without modification. Each of the new styles of lenses would only require a bottom surface capable of fitting into the recessed portion 264. The portion of the lenses visible to a human could be of other shapes. Lenses could, for example, be round or other shapes. A faceplate configured differently than faceplate 208 (FIG. 12) can be configured to accommodate lenses of other shapes.

The labels 212 (best seen in FIGS. 12 and 18A) may be created in many different ways but can most advantageously be created using widely available printers attached to a computer. The labels 212 may be printed in color or monochrome, as desired. The labels 212 may include text, symbols or even photographs. Moreover, the labels 212 may be a positive (opaque text with transparent background) or a negative (transparent text with opaque back ground). The labels 212 may be fabricated from a variety of materials, including without limitation, paper, plastic, metal, fabric or any other suitable material on which the selected printing technique may be used. Most advantageously, the labels 212 may be readily printed and replaced with only a minimum of instruction provided to the user since templates are provided for use with one of the widely available computer programs which will facilitate printing of the labels 212 (including word processing and graphic computer programs) and insertion of the label 212 is accomplished by simply disassembling the button assembly 209. Furthermore, the labels 212 may be die-cut or simply cut from the materials with a pair of scissors. Optionally, the text or symbols may be painted or engraved directly on the viewing surface 240 and/or the bottom surface 250 of the lens 210.

Figure 19:
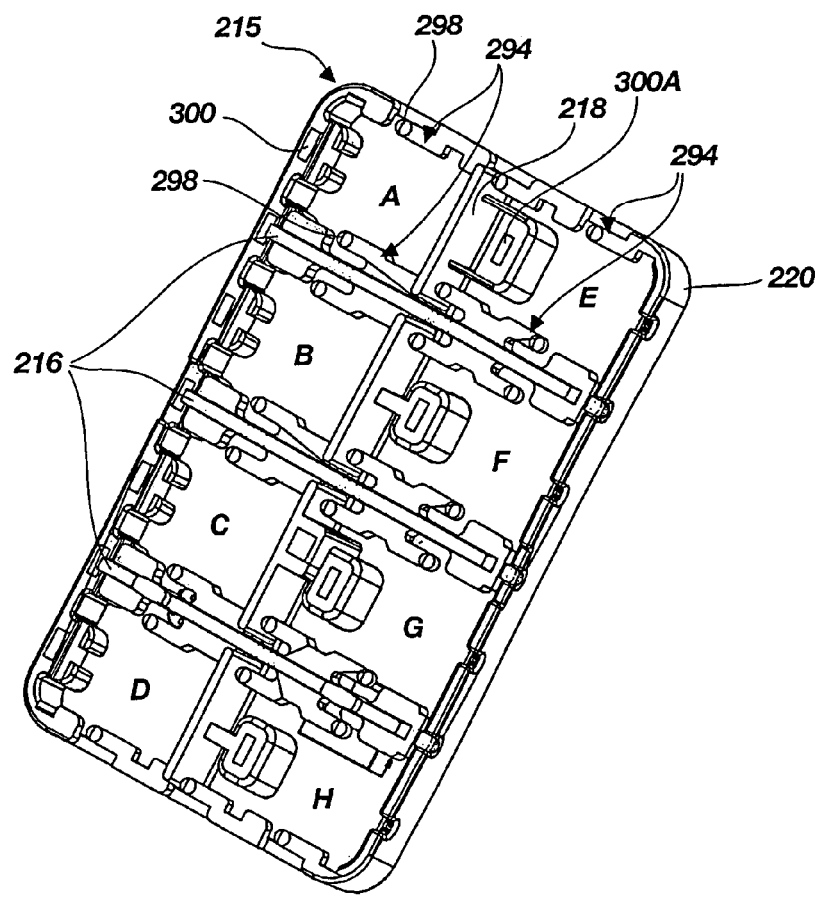
FIG. 19 is a perspective view of one illustrative embodiment of a configurable switch matrix assembly in accordance with the present invention.

Referring now to FIG. 19, there is shown one illustrative embodiment of an assembled configurable switch matrix assembly, generally indicated at 215 in FIG. 19 and by bracket 215 in FIG. 12, having up to eight button positions (labeled A-H) for receiving button assemblies 209. The frame 220 supports a plurality of cross members 216 to form the button positions (labeled A-H). In addition, a baffle 218 may optionally be used as will be further explained below.

As can be observed, each of the button positions (labeled A-H) is substantially enclosed on four sides by the frame 220, one or more of the cross members 216, and baffle 218. It will be appreciated that this enclosure formed by the aforementioned elements is sufficiently contained to prevent substantial bleeding of radiation from the back lights 232 or status indicator lights 230 to the other button positions. This allows each button position (labeled A-H) to have its own back lights 232 and status lights 230 of varying color and intensity. It should be mentioned that it is not a requirement of this invention that no radiation bleed from a button position. Some bleeding is acceptable and does not diminish the effectiveness of the present invention.

Each button position (A-H) has at least two cantilevers, some of which are generally designated 294, disposed on opposite sides of each button position, the cantilevers being shown in greater detail in FIG. 22. An attached end 292B of each of the cantilever arms 292 may be affixed to the frame 220 (as represented in FIG. 19) or a cross member 216 (as shown best in FIG. 19). Located on the free end 292A of each of the cantilevers arms 292 is an upwardly extending protrusion 298 having a somewhat rounded shape. As will be explained herein, the cantilevers 294 provide a biasing function to provide operation of the button assembly 209.

Each button position (labeled A-H in FIG. 19) further comprises a light shroud 300. The light shroud 300 may be integrated into the frame 220 or the light shroud 300A may be appended to the baffle 218. Either structure of light shroud 300 or 300A may be used for any button position (labeled A-H).

Figure 20:
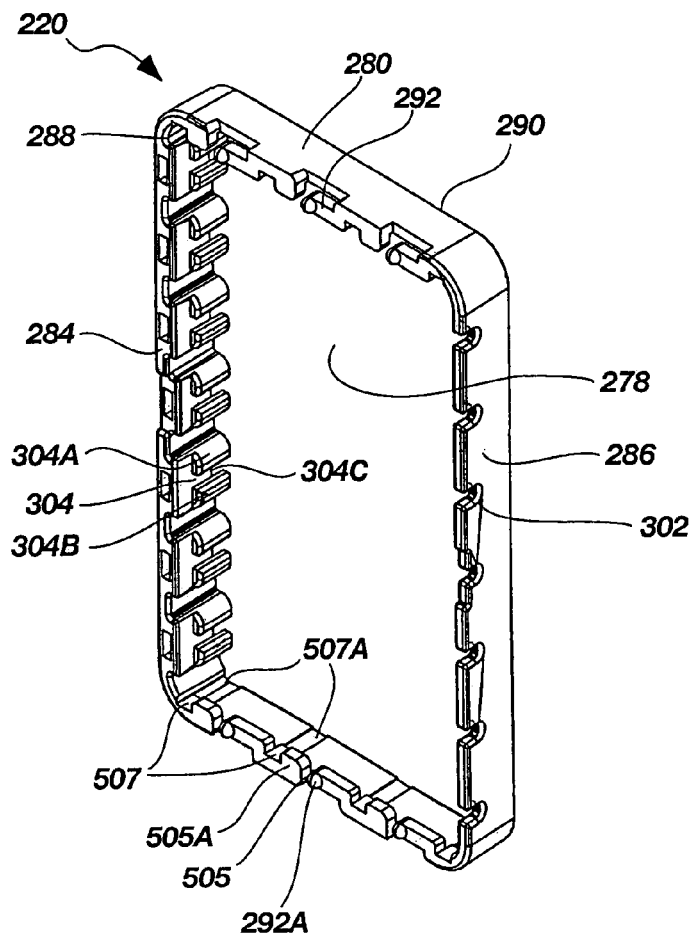
FIG. 20 is a perspective view of one illustrative embodiment of a frame configured in accordance one aspect of the present invention.

The frame 220 (FIG. 19) is substantially rectangular having an open interior 278, a front 288, and a back 290 (as shown in FIG. 20). Referring primarily to FIG. 20, the frame 220 further comprises a top support 280, a bottom support 282, and a left 284 and a right 286 support. Both the top support 280 and bottom support 282 comprise a plurality of cantilever arms 292 on the front 288 surface. In addition, the inner surface of both the top support 280 and the bottom support 282 may comprise a plurality of engaging slots 507 and corresponding paths 507A. For the top and bottom button positions A, D, E, H (see FIG. 19), the cantilever arms 292 are located on the frame 220 since it is adjacent to the named button positions.

Figure 20A:
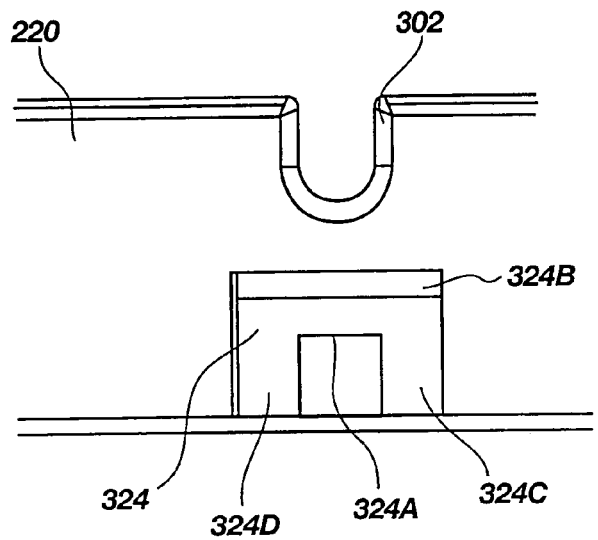
FIG. 20A is a breakaway view of a portion of the frame shown in FIG. 20.

The right support 286 (FIG. 20) comprises a plurality of cutouts 302. As shown in the detailed view of FIG. 20A, on the interior of the frame 220 and below each cutout 302 is an extrusion 324 comprising a first and second finger, 324C and 234D, respectively. The extrusion 324 further comprises a rounded upper surface 324B and an inner ledge 324A.

Referring again to FIG. 20, the left support 284 comprises a plurality of receiving channels 304. Each channel 304 being formed by a first and second wall, 304A and 304B, respectively. Each receiving channel 304 further comprises a bottom ledge 304C at its distal end.

The cutouts 302 (FIG. 20A) and receiving channels 304 (FIG. 20) are positioned so that each cutout 302 is directly across from a receiving channel 304. The cutouts 302, extrusions 324 (FIG. 20A) and receiving channels 304 provide points of attachment for cross members 216 as will be explained below. Cross members 216 may be positioned as desired to obtain the desired configuration of a switch matrix.

It will be appreciated that the structure and apparatus disclosed herein is merely one example of a means for releasably supporting one or more cross members, and it should be appreciated that any structure, apparatus or system for releasably supporting one or more cross members which performs functions the same as, or equivalent to, those disclosed herein are intended to fall within the scope of a means for releasably supporting one or more cross members, including those structures, apparatus or systems for releasably supporting one or more cross members which are presently known, or which may become available in the future. Any structure which functions the same as, or equivalently to, a means for releasably supporting one or more cross members falls within the scope of this element.

Referring now to FIGS. 21 and 22, each cross member 216 is of sufficient length to span between the left support 284 and right support 286 of the frame 210 (see FIG. 19). Each cross member 216 has a supporting cross brace 310 having a first end 306, a second end 308, a first side 310A, a second side 310B, a top surface 310C and a bottom surface 310D. The thickness between the first side 310A and the second side 310B should be relatively small in comparison with the overall length of the cross member 216. The bottom surface 310D has a plurality of notches 309 which allow for the various configurations of the configurable switch matrix assembly 215, and in particular, different positions for the baffle 218. Further, extending from the bottom surface 310D of the cross brace 310 may be an alignment post 320. The alignment post 320 may assist in properly aligning the configurable switch matrix assembly 215 over the electronic circuitry board 222 during assembly.

A plurality of wings 311 may extend in a perpendicular fashion from both the first side 310A and the second side 310B of the cross brace 310. Each wing 311 further comprises an upper surface 311A, lower surface 311B and an outer surface 311C. The upper surface 311A and the lower surface 311B being substantially perpendicular to the sides 310A and 310B of the cross brace 310. The outer face 311C being substantially parallel to the sides 310A and 310B of the cross brace 310.

From each wing 311 may extend one or more cantilever arms 292, each cantilever arm 292 having a protrusion 298 on its free end 292A. The cantilever arms 292 and the first side 310A and second side 310B are substantially parallel to each other as can best be seen in FIG. 22. The wings 311 may serve to offset the cantilever arms 292 from the cross brace 310. An attached end 292B of each cantilever arm is attached to a wing 311. Two cantilever arms 292 may extend from the same wing 311 in opposing directions.

The cross brace 310 should be of sufficient height, shown by the dimension 319 in FIG. 21, between the top surface 310C and the bottom surface 310D such that the top surface 310C is in close proximity with the faceplate 208 and that the bottom surface 310D is in close proximity to the electronic circuitry board 222 when the switch matrix assembly 200 is assembled. It will be appreciated that this inhibits light from passing from one button position (labeled A-H) to another as previously discussed.

Extending from the first end 306 of the cross brace 310 may be a guide post 312. A lower ledge 314A, back surface 314B, and an upper ledge 314C form a holding slot 314 in the first end 306. A slanted edge 322A is disposed between the bottom surface 310D of the cross brace 310 and the lower ledge 314A. A ledge 318 also extends perpendicularly from the second end 308 as well. A slanted edge 322B is disposed between the bottom surface 310D of the cross brace 310 and the ledge 318.

Figure 23:
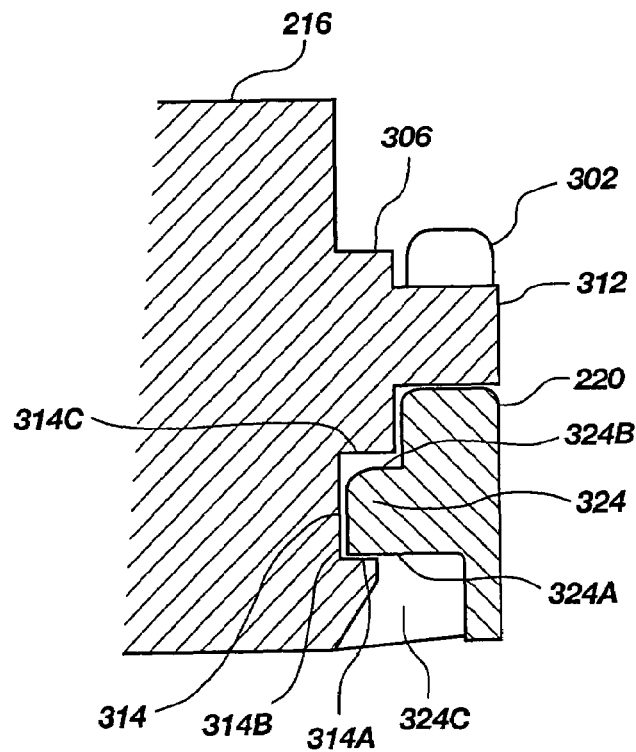
FIG. 23 is a cross-sectional breakaway view of the cross member and frame, shown in FIGS. 20, 21 and 22, coupled together.

Each cross member 216 may be attached to the frame 220 at its first end 306 and second end 308. FIG. 23 is a cross-sectional view of one manner in which the first end 306 may be attached to the frame 220. The guide post 312 is first positioned in the cutout 302. The holding slot 314 next engages the extrusion 324 on the frame 220. In particular, the rounded upper surface 324B and inner ledge 324A of the extrusion 324 are held in place by the lower ledge 314A and upper ledge 314C of the holding slot 314. The lower ledge 314A and the slanted edge 322A of the cross member 216 are further held in place between the first finger 324C and second finger 234D (see FIG. 20A) of the extrusion 324. It will be appreciated that this engagement arrangement provides a desirable snap fit between the holding slot 314 and the extrusion 324.

Figure 24:
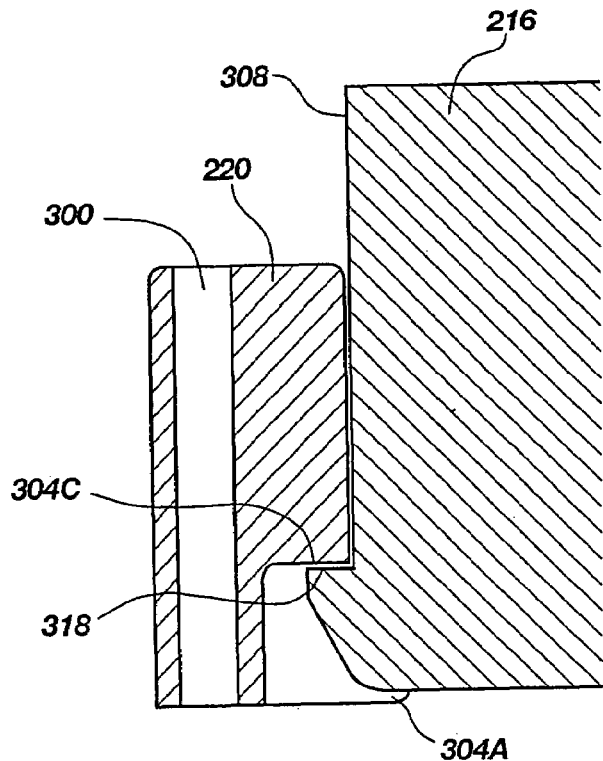
FIG. 24 is another cross-sectional breakaway view of the cross member and frame, shown in FIGS. 20, 21 and 22, coupled together.

The second end 308 of the cross member 216 may also engage the frame 220 with a snap fit as shown in FIG. 24. The ledge 318 on the second end 308 engages the bottom ledge 304C of the receiving channel 304 (partially shown) on the frame 220 to thereby form the snap fit. The first wall 304A and second wall 304B (not shown) of the receiving channel 304 assist in holding the cross member 216 on place.

Figure 25A:
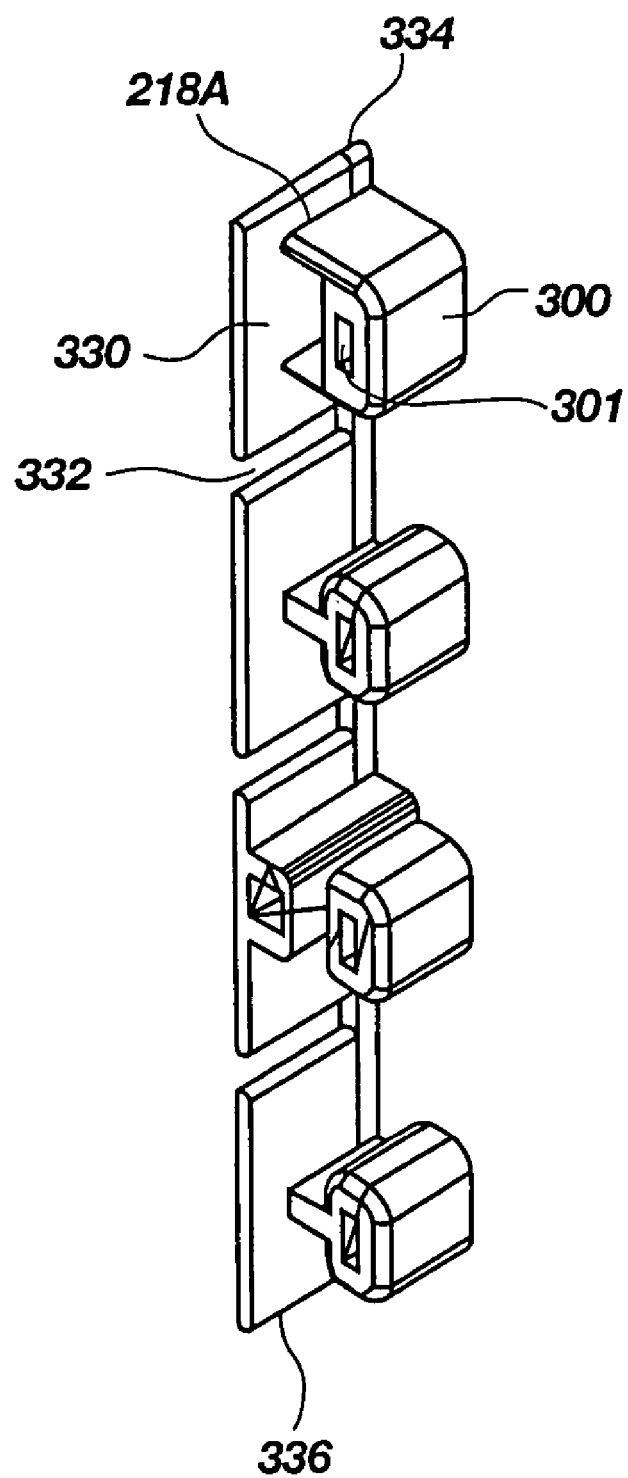
FIG. 25A is a perspective view an exemplary four panel baffle in accordance with the present invention.
Figure 25B:
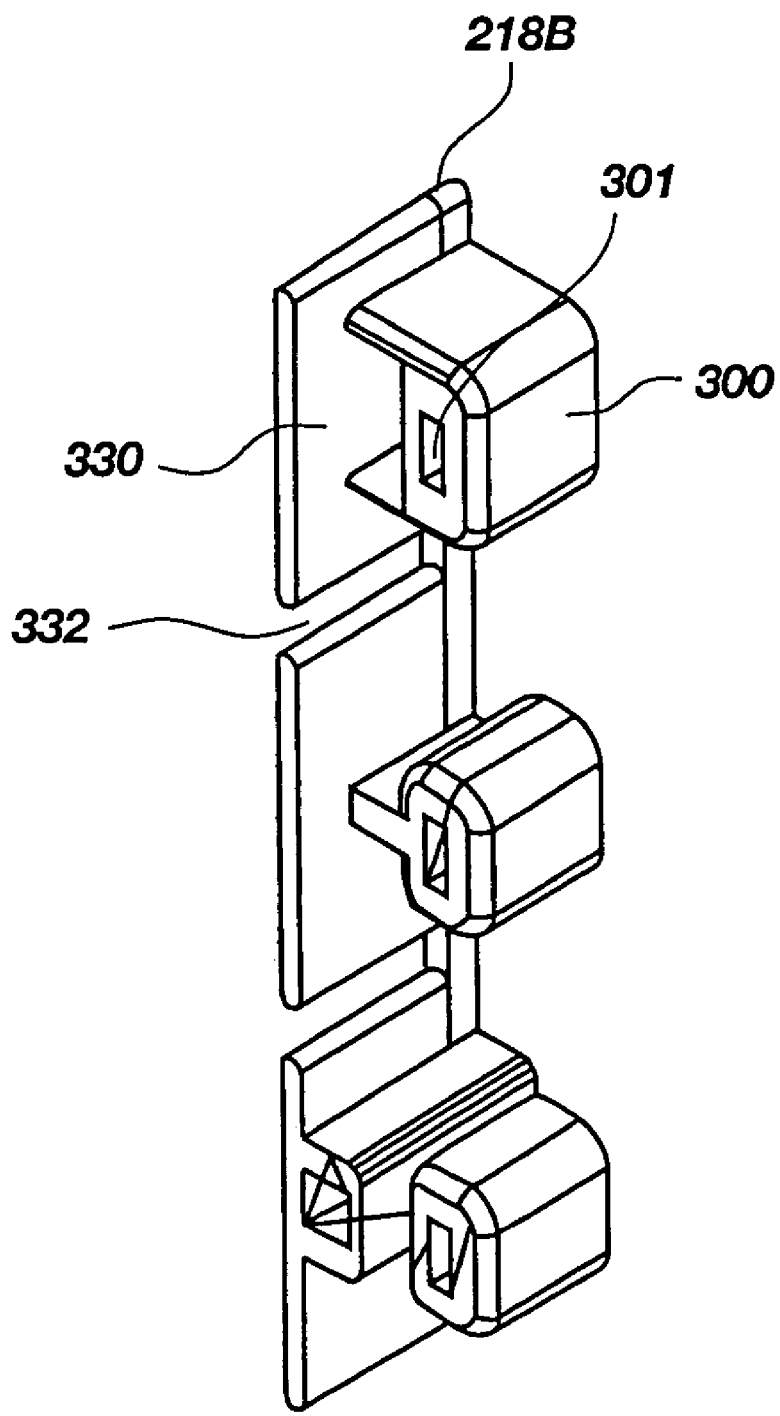
FIG. 25B is a perspective view an exemplary three panel baffle in accordance with the present invention.

It will be appreciated that the structure and apparatus disclosed herein is merely one example of a means for releasably attaching a cross member, and it should be appreciated that any structure, apparatus or system for releasably attaching a cross member which performs functions the same as, or equivalent to, those disclosed herein are intended to fall within the scope of a means for releasably attaching a cross member, including those structures, apparatus or systems for releasably attaching a cross member which are presently known, or which may become available in the future. Any structure which functions the same as, or equivalently to, a means for releasably attaching a cross member falls within the scope of this element A first illustrative embodiment of a baffle 218A is shown in FIG. 25A, while a second illustrative embodiment of a baffle 218B is shown in FIG. 25B. The two different embodiments represented in FIGS. 25A-B may be used when creating different button patterns as will be addressed below. Each of the baffles, 218A and 218B, comprise a plurality of light shrouds 300 and a plurality of panels 330.

A light shroud 300 forms a barrier so that radiation (light) from any light emitting device positioned underneath, such as status lights 230, cannot be observed in the label region 248 on the viewing surface 240 of the lens 210 (see FIG. 13) during operation. Further, the light shrouds 300 ensure that the majority of radiation emitted from any device positioned underneath is channeled primarily only to the status region 246 on the viewing surface 240 of the lens 210 (see FIG. 13). Each light shroud 300 has a hollow light channel 301 through which radiation from a status light 230 may pass. An alternative, equivalent structure to the illustrated light shroud 300 could comprise a fiber optic structure to channel the radiation. As discussed earlier, light shrouds 300 may also be incorporated into the frame 220.

It will be appreciated that the structure and apparatus disclosed herein is merely one example of a means for channeling a light (or radiation), and it should be appreciated that any structure, apparatus or system for channeling a light which performs functions the same as, or equivalent to, those disclosed herein are intended to fall within the scope of a means for channeling a light, including those structures, apparatus or systems for channeling a light which are presently known, or which may become available in the future. Any structure which functions the same as, or equivalently to, a means for channeling a light falls within the scope of this element.

The panels 330 are substantially planar and reside in a substantially perpendicular orientation to the electronic circuitry board 222 when assembled. The panels 330 are spaced apart on each baffle 218A and 218B to form a plurality of slots 332. The slots 332 allow the cross members 213 to extend without interference. In addition, the cross members 213 may engage the sides of the slots 332 to maintain the shrouds 218A and 218B in the proper position after assembly. The panels 330 also form a barrier whereby radiation from the status lights 330 and back lights 232 for a particular button position cannot be observed at a different, distinct button position.

The baffle 218A further comprises a top edge 334 and a bottom edge 336. The top edge 334 and bottom edge 336 may engage one of the plurality of gaps 305 (FIG. 20) on the top and bottom supports, 280 and 282 (FIG. 20), respectively, of the frame 220 to further assist in holding the baffle 218A in place. The gaps 505 are formed between a free end 292A of a cantilever arm 292 and a nub 505A extruding from the frame 220 as shown in FIG. 20. It should also be noted that either baffle 218A and 218B may not need to engage the frame at all and may be held in place only by the cross members 216. If desired, a baffle may even be absent altogether. For example, in a case where there is no backlighting a baffle would not be needed.

As can be observed in FIG. 25A, baffle 218A has four panels 330 and four light shrouds 300. Baffle 218B (FIG. 25B), on the other hand, has three panels 330 and three light shrouds 300. It will be appreciated that either baffle (218A or 218B) may be used in the illustrative embodiments of the present invention depending on the desired button pattern presented to the user.

It will be appreciated that the structure and apparatus disclosed herein is merely one example of a means for baffling light, and it should be appreciated that any structure, apparatus or system for baffling light which performs functions the same as, or equivalent to, those disclosed herein are intended to fall within the scope of a means for baffling light, including those structures, apparatus or systems for baffling light which are presently known, or which may become available in the future. Any structure which functions the same as, or equivalently to, a means for baffling light falls within the scope of this element.

Figure 26:
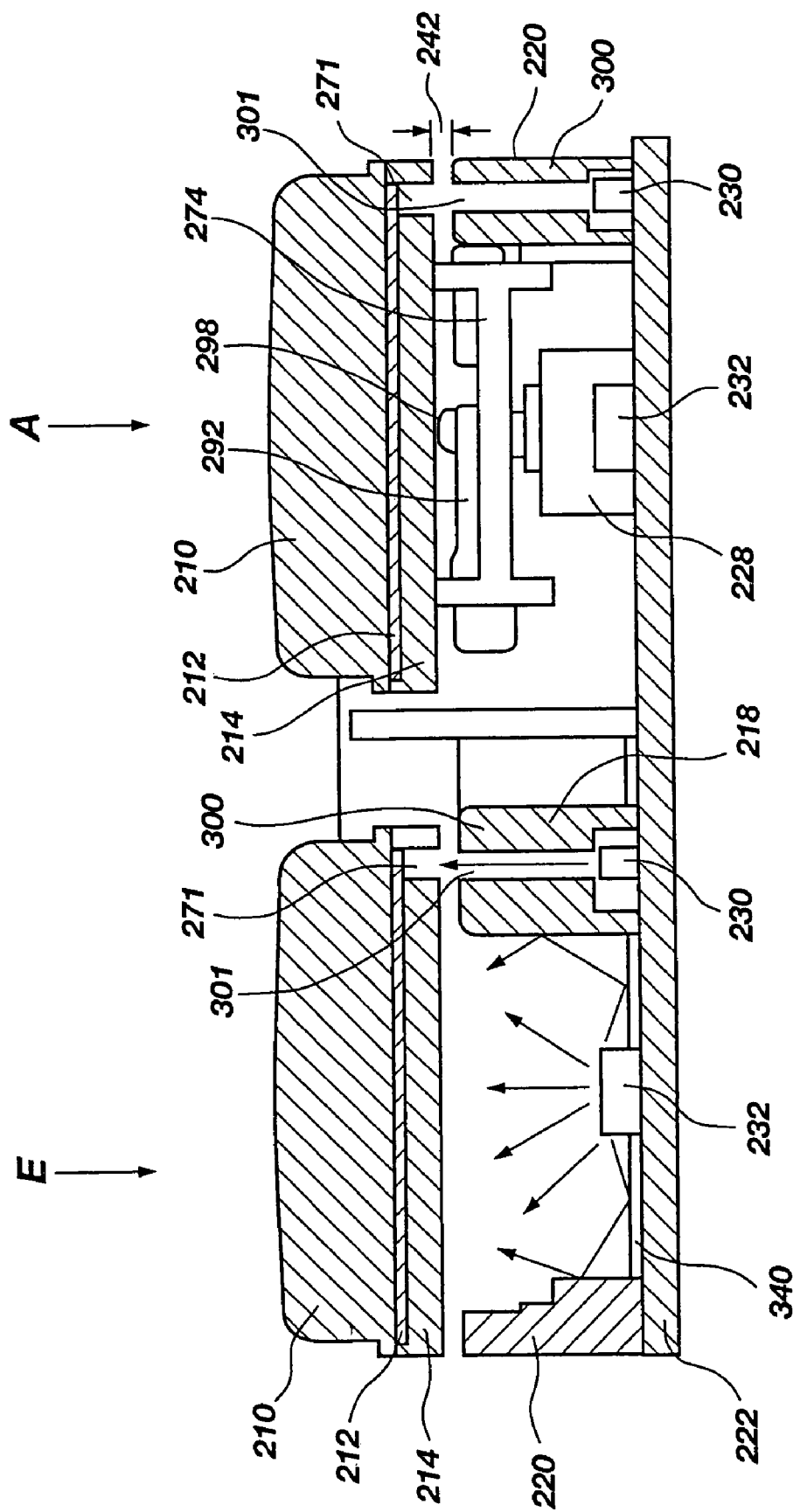
FIG. 26 is a cross-sectional view of an exemplary button assembly and configurable switch matrix assembly coupled together in accordance with the present invention.

A cross-sectional view of button positions A and E from FIG. 19 is shown in FIG. 26. For purposes of discussion, some of the elements for button position E have been omitted for sake of clarity when discussing the propagation of light (radiation). As previously explained, each button position may comprise a switch 228, status lights 230, and back lights 232.

The status lights 230 may be located along the perimeter of the button position. Over the status lights 230 is a light shroud 300. It will be appreciated that locating the status lights 230 along the perimeter ensures that the light shroud 300 does not substantially interfere with the propagation of light from the back lights 232. The light from the status lights 230 is directed through the light channel 301 of the light shroud 300. The light then passes through the passage 271 on the base 214 and impinges the label 212. It will be appreciated that by directing the light in this manner, that the status region 246 (see FIG. 13) on the lens 210 will be the primary location that is illuminated. It should also be noted that the light shroud 300 may be appended to the baffle 218 such as with button position E or the light shroud 300 may be integrated into the frame 220 such as is shown with button position A.

The back lights 232 may be positioned in the middle of the button position to maximize an even distribution of illumination. The back lights 232 are primarily for illuminating the label 212 when viewed in the label region 248 (see FIG. 13). The light from the back lights 232 propagates from the back lights 232 and through the base 214. The base 214 may diffuse the light to thereby create a softer illumination of the label 212 than light shining directly on the label 212. The labels 212 appear more evenly illuminated throughout the label region 248 when viewed through the lenses 210 with diffused light rather than direct light. The light propagation is represented in button position E with a plurality of arrows.

An optional reflection layer 340 may be added on top of the electronic circuitry board 222. The reflection layer 340 will increase light propagation in the desired direction. The reflection layer 340 may comprise solder mask and silkscreen type materials, but may include any material known to reflect or disburse light, as known to those involved in the industry.

In addition to the status lights 230, back lights 232, and light shroud 300, each button position may further comprise a switch 228 as can be seen in button position A. The switch 228 is positioned such that when the button assembly 209 is depressed that the cross support 274 actuates a plunger on the switch 228. It will be appreciated that while a plunger mechanism could be used, the use of the cross support 274 allows the switch 228 to be placed near the perimeter of the button position to thereby not interfere with the propagation of radiation emitted from the back lights 232 to the label 212 and lens 210.

The status lights 230 and back lights 232 may comprise a single light emitting device or a plurality of light emitting devices. In one illustrative embodiment of the present invention, the status lights 230 and back lights 232 each comprise devices which emit red light, green light and blue light. In another illustrative embodiment, devices emitting red, yellow and blue light may be used. In still another illustrative embodiment, both the status lights 230 and back lights 232 comprise two individual light emitting devices chosen from the group comprising devices which emit: red, green, blue and yellow light. Using the above combinations, virtually an unlimited number of colors can be created, including white light, by varying the intensity of the individual light emitting devices.

Further, each of the individual light emitting devices comprising the status lights 230 and back lights 232 may be under the control of a micro-processor. Thus, the colors of the status lights 230 and back lights 232 can be automatically adjusted pursuant to any preset condition, including input from a light sensor, the time of day, or even by manual input from a user. In addition, the status lights 230 and back lights 232 can be programmed to change color or vary in intensity to reflect changes in load or programming state. In this sense, even the back lights 232 can be used as a "status" light to relate information to an observer, including changes in the intensity and/or color perceived by the user to convey information.

The preferred devices to function as the status lights 230 and back lights 232 are light emitting diodes (LEDs) due to their low cost, long life, low power rating and low power consumption. Further, the use of two or more lights of different colors to provide varying colors of light is not limited to back lights 232 or status lights 230. This aspect of the present invention can be applied in any circumstance where similar radiation is used to convey information or to provide an aesthetic impression. For example, virtually any apparatus using small light emitting devices, such as LEDs, may utilize two or more light emitting devices, or one device capable of emitting visible radiation in multiple wavelengths, to provide customized colors in accordance with the present invention.

As discussed previously, each button position may utilize two cantilevers 294 to bias each button assembly 209 toward a normal (unactuated) position. The cantilevers 294, including cantilever arms 292, are composed of a resilient material having a memory. When a button assembly 209 is installed, the protrusions 298 on the free end 292A of each cantilever 292 engages the bottom surface 262 of the base 214. The bottom surface 262 of the base 214 slightly depresses the protrusions 298 on each of the cantilevers 292 when the button assembly 209 is installed. The resilient nature of the two cantilevers 292 provides a biasing or restoring force upwardly directed to maintain the button assembly 209 above the switch 228 in a normal (unactuated) position.

As discussed above, the protrusions 298 may maintain a slight upward force on the button assembly 209 so that the switch 228 is only actuated when the button assembly 209 is actually depressed. It is not necessary that the protrusions 298 be fixidly engaged to the button assembly 209. This structure allows the protrusions 298 to move freely when the button assembly 209 is depressed. When the button assembly 209 is depressed, the resilient nature of the two cantilevers 292 provides a restoring force to return the button assembly 209 to its normal (unactuated) position when the button assembly 209 is released.

It will be appreciated that the structure and apparatus disclosed herein is merely one example of a means for providing a restoring force, and it should be appreciated that any structure, apparatus or system for providing a restoring force which performs functions the same as, or equivalent to, those disclosed herein are intended to fall within the scope of a means for providing a restoring force, including those structures, apparatus or systems for providing a restoring force which are presently known, or which may become available in the future. Any structure which functions the same as, or equivalently to, a means for providing a restoring force falls within the scope of this element.

Figure 27:
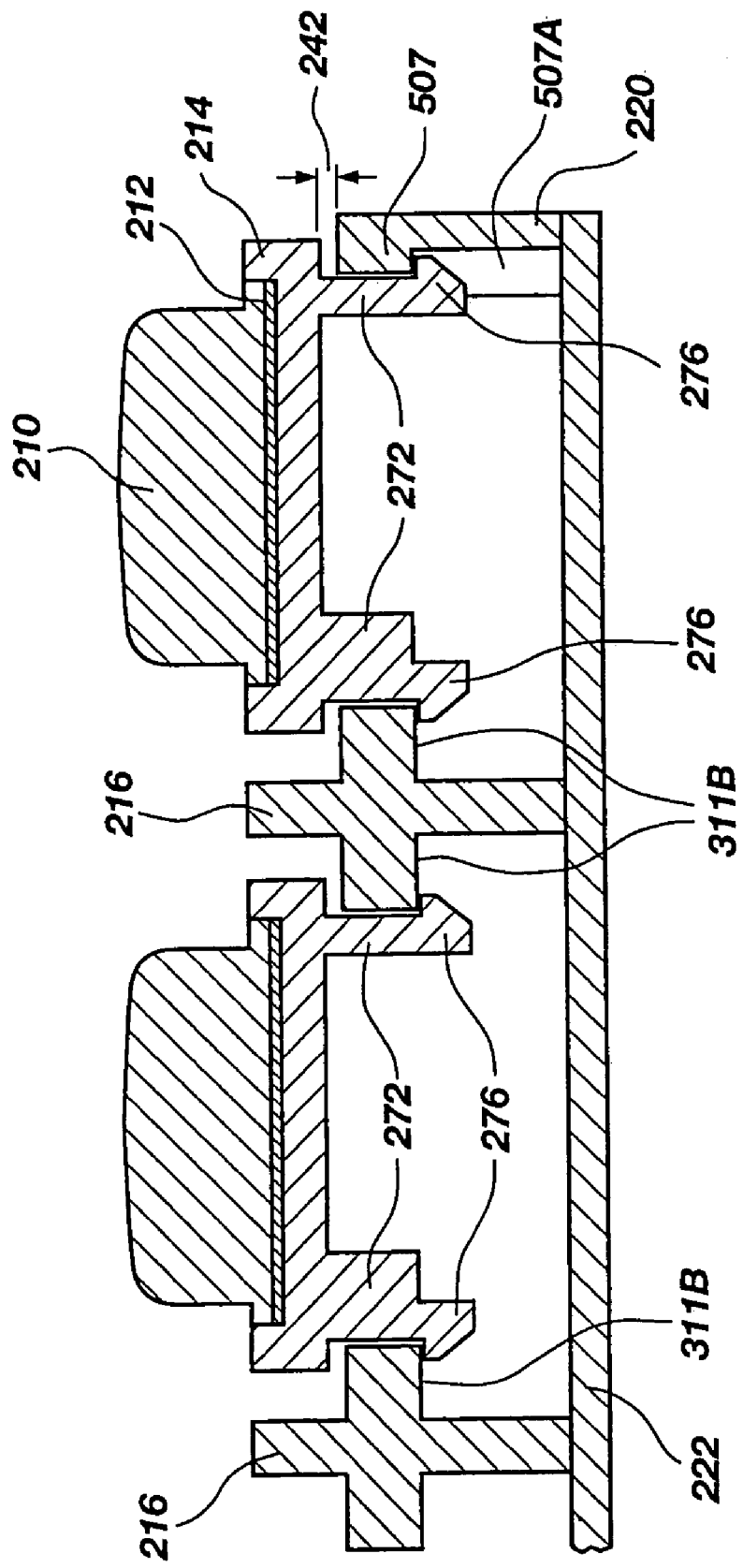
FIG. 27 is another cross-sectional view of an exemplary button assembly and configurable switch matrix assembly coupled together in accordance with the present invention.

Referring now to FIG. 27, the engagement members 276 on each of the legs 272 of the base 214 removably attaches the button assembly 209 to the configurable switch matrix assembly 215. Each of the engagement members 276 either engages the lower surface 311B of a wing 311 extending from a cross member 216 or engages an engaging slot 507 of the frame 220 depending on the location of the button assembly 209. It will be appreciated that this may be a snap fit between the button assembly 209 and the configurable switch matrix assembly 215. The engagement members 276 hold the button assembly 209 in its normal position against the restoring force of the cantilevers 292. Advantageously, it will be appreciated that a faceplate 208 is not required to hold the button assembly 209 in position since the buttons assembly 209 will not come apart even when the faceplate is not in place. Moreover, the structure described herein provide a pivot point for the base 214 to push against so the lens 210, acting as a button, can be pressed even on its edges.

It will be appreciated that the structure and apparatus disclosed herein is merely one example of a means for releasably attaching a button or key, and it should be appreciated that any structure, apparatus or system for means for releasably attaching a button or key which performs functions the same as, or equivalent to, those disclosed herein are intended to fall within the scope of a means for releasably attaching a button or key, including those structures, apparatus or systems for releasably attaching a button or key which are presently known, or which may become available in the future. Any structure which functions the same as, or equivalently to, a means for releasably attaching a button or key falls within the scope of this element.

Still referring to FIG. 27, once coupled to the configurable switch matrix assembly 215, a button assembly 209 may, upon being depressed, travel a short distance to activate a switch 228. This travel distance is shown by the dimension marked with the reference numeral 242. This travel distance is also represented in FIG. 26 by the same reference numeral 242. Once depressed, a button assembly 209 travels downward until released or until the bottom surface 262 of the base 214 collides with the front 288 of the frame 220 or the upper surface 311A of a wing 311. In this manner the button assembly 209 is prevented from damaging the switch 228 from excessive force being applied to the button assembly 209. In addition, the path 507A on the frame 220 allows the engagement member 276 to travel unimpeded next to the frame 220.

It will be appreciated that the use of the frame 220, cross members 216, and baffles 218A and 218B, advantageously provides a configurable switch matrix assembly 215. For purposes of this application, configurable switch matrix assembly means a switch matrix whose components may be rearranged to allow different button configurations.

Figure 28A:
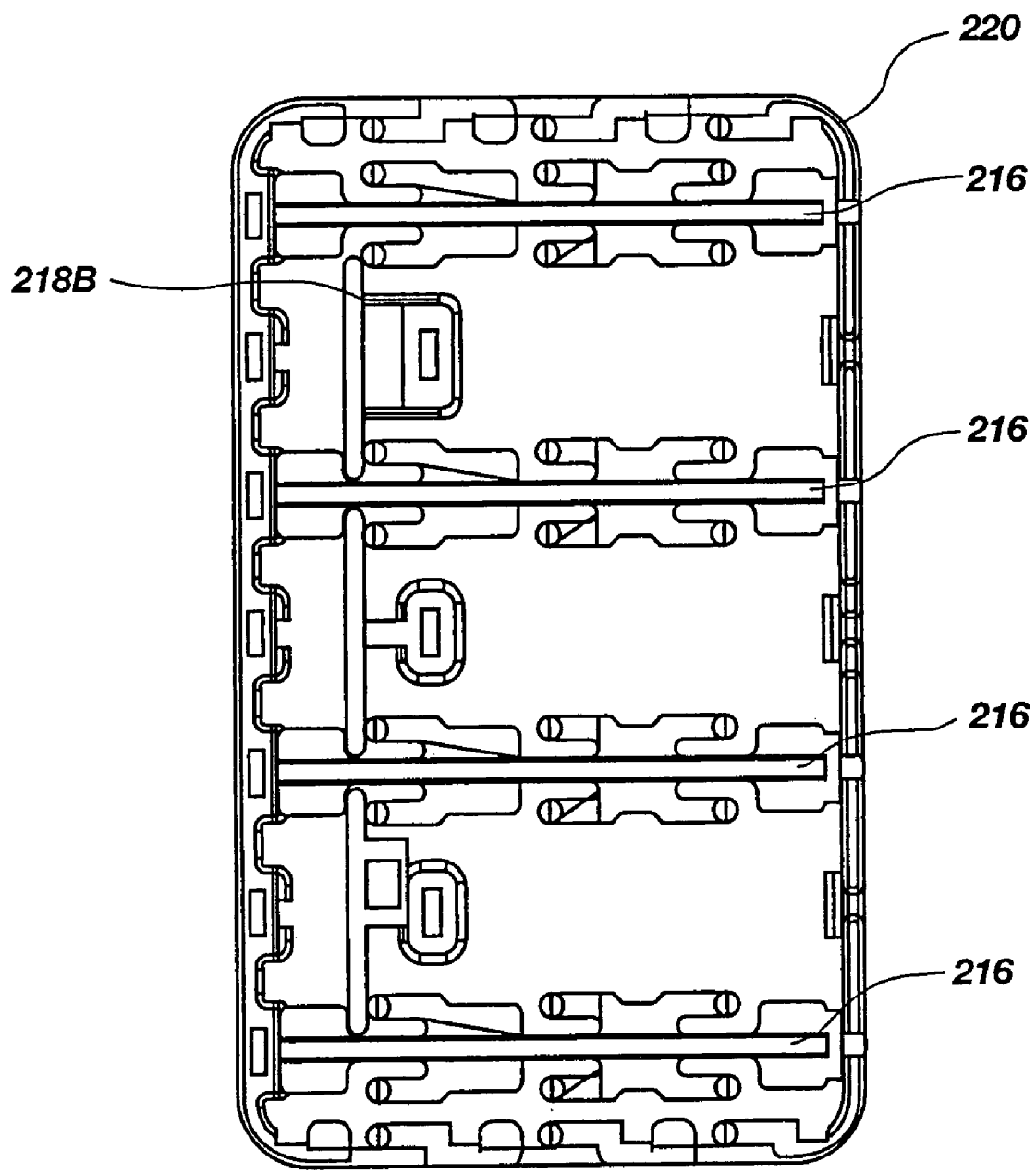
FIGS. 28A-C show the various illustrative configurations of the configurable switch matrix assembly of the present invention.
Figure 28B:
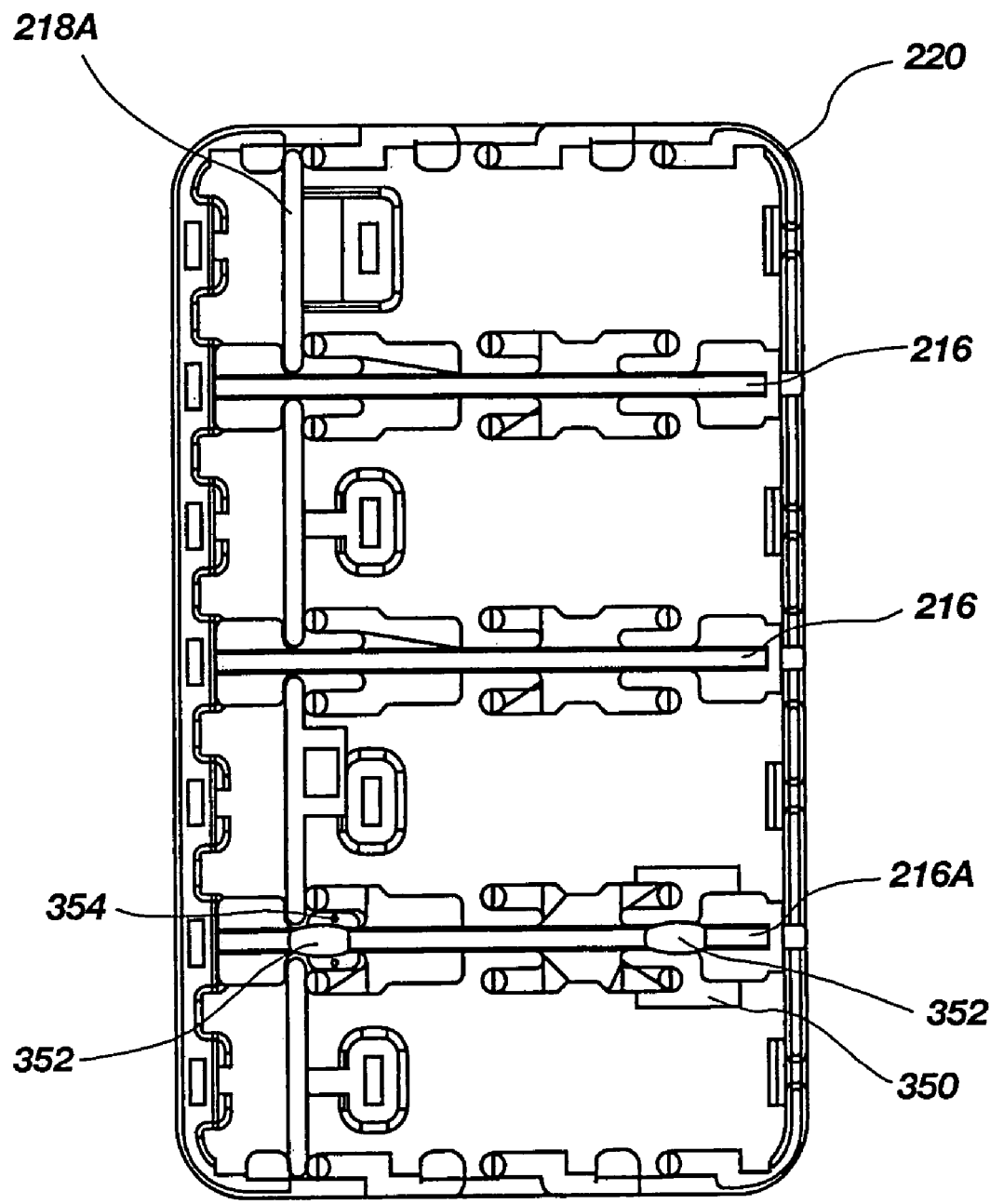
Figure 28C:
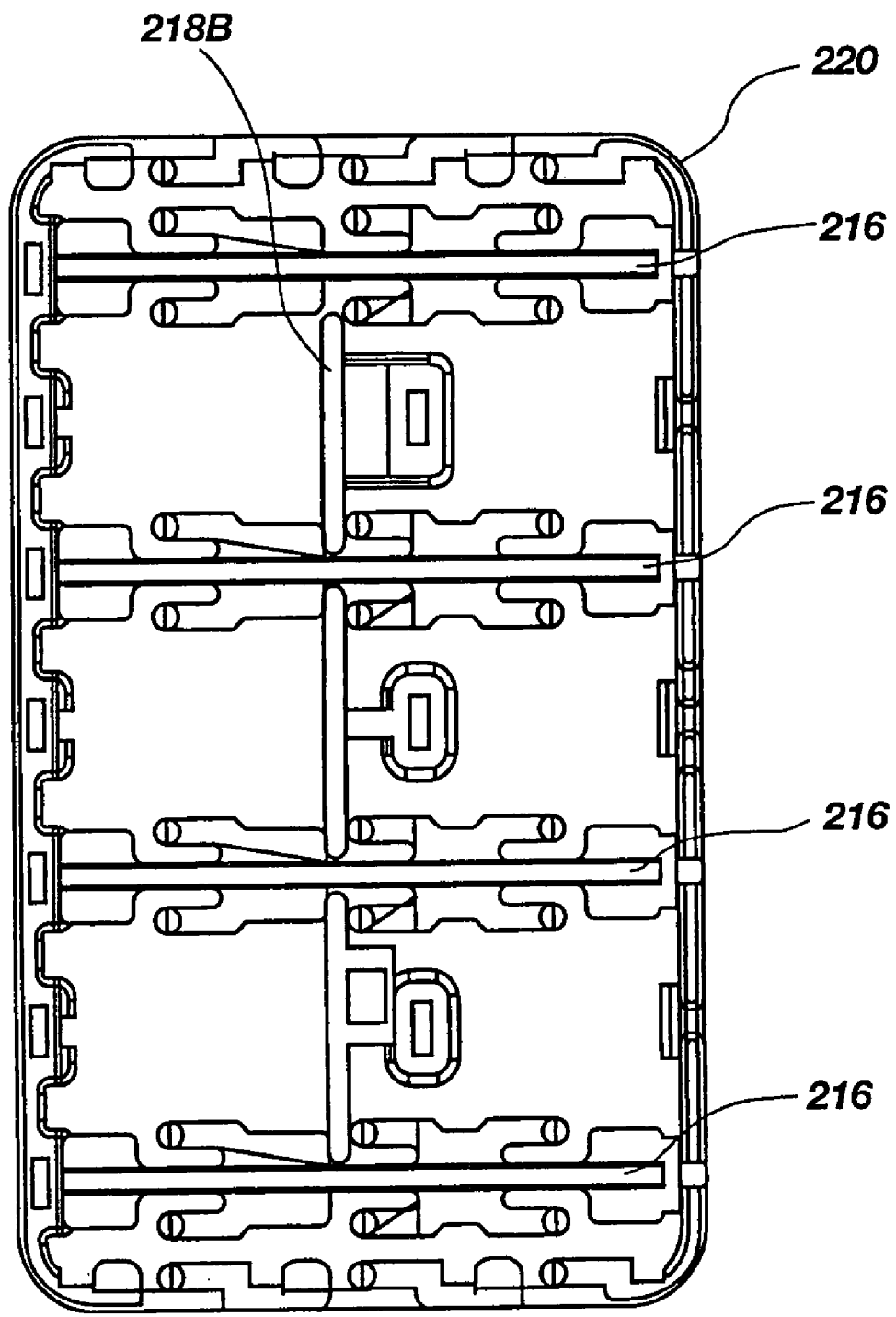

As can be seen in FIGS. 28A-28C, the configurable switch matrix assembly 215 may be configured in a one button center (FIG. 28A), three button center (FIG. 28A), four button center (FIG. 28B), or six-button double row (FIG. 28C) configurations in addition to the eight button double row (FIG. 19) configuration. It will be appreciated that one illustrative embodiment of the configurable switch matrix assembly 215 may provide several different button patterns by simply changing the position of the cross members 216 and baffle 218A or 218B.

As used herein, the term "button position" refers to a location on a switch matrix assembly where a button or a key is installed. A button position may be formed by the frame 220 and cross members 216, and optionally a baffle 218A or 218B. It will be appreciated that different arrangements of the frame 220, cross members 216, and baffles 218A or 218B may created button positions in varying locations. Other configurations are possible using the same principles as are described herein and are within the scope of this invention.

In addition, in a separate embodiment, a cross member 216A (see FIG. 28B) may comprise one or more integrated lenses 252 that may be used to accept IR signals through an IR receiver 354, both of which may be connected to the electronic circuitry board 222. This cross member 216A may be used in any of the configurations described or suggested herein. It will be appreciated that, advantageously, the inclusion of an IR receiver and/or light sensor does not require a reduction in the number of buttons used on a keypad.

It should also be noted that the configurable switch matrix assembly 215 is not limited to the button assemblies 209 described herein. The configurable switch matrix assembly 215 may utilize keys or buttons of unitary or one piece construction.

In view of the foregoing, it will be appreciated that the present invention provides a configurable switch matrix assembly which is capable of being used with keys or buttons of different sizes and shapes. The present invention also provides a configurable switch matrix assembly which allows the buttons or keys to be arranged in different configurations using differing numbers of keys or buttons. The present invention further provides a configurable switch matrix which allows the keys to be easily installed and replaced without damaging the matrix. The present invention also provides a button assembly which allows labels to be easily installed or replaced. The present invention also provides back lights and status lights with customizable colors, functions and intensity.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention have been shown in the drawings and fully described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A keypad assembly comprising:
   a support frame, the support frame comprising a first support, a second support, a third support and a fourth support;
   a cross member having a first and second ends, the cross member being attached to the third and fourth support to form one or more button positions, each button position comprising a first cantilever and a second cantilever;

at least one first cantilever disposed on the first support or the second support;

at least one second cantilever disposed on the cross member;

a guide post disposed on the first end of the cross member;

a protruding ledge disposed on the second end of the cross member;

a receiving channel disposed on the third support;

a cutout disposed on the fourth support;

a circuit board, said circuit board comprising a switch for each button position;

a button or key releasably attached in each button position, each button or key comprising a bottom surface, said bottom surface non-fixidly engaging the first and second cantilevers; and whereby the switch for each button position may be actuated by depressing its associated button or key, said first and second cantilevers restoring the depressed button or key to its prior position when released.

2. The keypad assembly of claim 1 wherein said first and second cantilevers of each button position exert a force to maintain their associated button or key in an undepressed position.

3. The keypad assembly of claim 1 wherein each button position comprises a first side and a second side, said first cantilever protruding from the first side and said second cantilever protruding from the second side.

4. The keypad assembly of claim 3 wherein the first cantilever is substantially parallel to the first side and the second cantilever is substantially parallel to the second side.

5. The keypad assembly of claim 1 wherein the first and second cantilevers each comprise an attached end and free end, said free end having a protrusion for non-fixidly engaging the bottom surface of the button or key.

6. The keypad assembly of claim 1 wherein the cross member is attached to the frame by (a) inserting the guide post into the cutout on the fourth support, and (b) inserting the protruding ledge into the receiving channel on the third support.

7. The keypad assembly of claim 1 wherein the circuit board further comprises a first light source and a second light source for each button position, said first light source illuminating a first region on the button or key and the second light source illuminating a second region on the button or key.

8. The keypad assembly of claim 7 wherein each button position further comprises a light shroud, said light shroud comprising a top, a bottom, and a hollow light channel, said light shroud disposed over said first light source.

9. The keypad assembly of claim 8 wherein the button or key comprises a button assembly, said button assembly comprising a lens and a base, said base further comprising an open passage disposed over the top of the shroud thereby allowing light emitted from the first light source to pass through the base unimpeded to illuminate the first region.

10. The keypad assembly of claim 9 wherein light emitted from the second light source travels through the base to illuminate the second region, said base composed of a semi-transparent material to diffuse the light emitted from the second light source.

11. The keypad assembly of claim 7 wherein the second light source is comprised of a first plurality of light sources controlled by a micro-processor, said first plurality of light sources capable of producing light of varying colors as dictated by the micro-processor.

12. The keypad assembly of claim 11 wherein the first light source is comprised of a second plurality of light sources controlled by a micro-processor, said second plurality of light sources capable of producing light of varying colors as dictated by the micro-processor.

13. The keypad assembly of claim 12 wherein the first and second plurality of light sources each comprise two or more LEDs.

14. The keypad assembly of claim 13 wherein the two or more LEDs comprises a red, green and blue LED.

15. The keypad assembly of claim 14 wherein the base comprises a top surface having a recessed portion, said lens releasably attaching to the recessed portion, a label being interposed between the lens and the recessed portion of the top surface of the base, wherein the label is illuminated by both the first light source and the second light source.

16. The keypad assembly of claim 1 wherein the cross member further comprises an integrated lens and an IR receiver, the integrated lens and IR receiver being adapted to accept IR signals.

* * * * *